(12) United States Patent
Miller et al.

(10) Patent No.: US 11,748,834 B1
(45) Date of Patent: Sep. 5, 2023

(54) SYSTEMS AND METHODS FOR PLANNING AND OPTIMIZING THE MITIGATION OF POTENTIAL IMPACTS TO CRITICAL INFRASTRUCTURE OR KEY RESOURCES

(71) Applicant: Priority 5 Holdings, Inc., Needham, MA (US)

(72) Inventors: Charles Q. Miller, Medfield, MA (US); Allen D. Bierbaum, Ames, IA (US); Aron L. Bierbaum, Ankeny, IA (US); Wayne A. Rowcliffe, Ames, IA (US); David M. Miller-Klugman, Medfield, MA (US)

(73) Assignee: Priority 5 Holdings, Inc., Needham, MA (US)

( * ) Notice: Subject to any disclaimer, the term of this patent is extended or adjusted under 35 U.S.C. 154(b) by 434 days.

(21) Appl. No.: 16/781,164

(22) Filed: Feb. 4, 2020

Related U.S. Application Data

(63) Continuation of application No. 15/139,743, filed on Apr. 27, 2016.

(60) Provisional application No. 62/153,148, filed on Apr. 27, 2015.

(51) Int. Cl.
*G06Q 50/26* (2012.01)
*G06Q 10/0631* (2023.01)

(52) U.S. Cl.
CPC ....... *G06Q 50/26* (2013.01); *G06Q 10/063114* (2013.01); *G06Q 10/063118* (2013.01); *G06Q 10/06313* (2013.01)

(58) Field of Classification Search
CPC ............ G06Q 50/26; G06Q 10/063114; G06Q 10/063118; G06Q 10/06313
See application file for complete search history.

(56) References Cited

U.S. PATENT DOCUMENTS

| | | | |
|---|---|---|---|
| 8,612,276 B1 | 12/2013 | Nielsen et al. | |
| 10,019,677 B2* | 7/2018 | Gill et al. | G06Q 10/067 |
| 2002/0010615 A1* | 1/2002 | Jacobs | G06Q 10/10 705/7.15 |
| 2002/0128810 A1* | 9/2002 | Craig et al. | G05B 17/02 703/17 |
| 2006/0167728 A1* | 7/2006 | Siegel et al. | G06F 3/04855 705/7.33 |
| 2006/0190368 A1* | 8/2006 | Kesterman | G06Q 40/02 707/999.1 |
| 2007/0016955 A1 | 1/2007 | Goldberg et al. | |
| 2007/0021954 A1* | 1/2007 | El-Damhougy | G06F 13/387 703/21 |
| 2008/0133300 A1 | 6/2008 | Jalinous | |
| 2008/0172262 A1* | 7/2008 | An et al. | G06Q 10/0637 705/7.38 |
| 2010/0043074 A1* | 2/2010 | Scates | G06F 21/577 726/25 |
| 2011/0181443 A1* | 7/2011 | Gutierrez et al. | G01C 21/3697 340/990 |
| 2013/0174259 A1* | 7/2013 | Pearcy et al. | H04L 63/20 726/25 |
| 2014/0007244 A1* | 1/2014 | Martin et al. | G06F 21/577 726/25 |
| 2014/0200953 A1* | 7/2014 | Mun | G06Q 10/04 705/7.28 |
| 2015/0095102 A1* | 4/2015 | Hanley et al. | H04L 43/08 705/7.28 |

* cited by examiner

*Primary Examiner* — Renae Feacher
(74) *Attorney, Agent, or Firm* — Culhane Meadows PLLC; Orlando Lopez

(57) ABSTRACT

Systems and methods for planning and optimizing the mitigation of projected effects of possible disruptive events, whether natural or human-initiated, on critical infrastructure or key resources, which critical infrastructure or key resources may be damaged, the functionality of which may be otherwise altered or which may become unavailable as a result of the occurrence of such events, are disclosed.

21 Claims, 14 Drawing Sheets

SYSTEMS AND METHODS FOR PLANNING AND OPTIMIZING THE MITIGATION OF POTENTIAL IMPACTS TO CRITICAL INFRASTRUCTURE OR KEY RESOURCES

CROSS REFERENCE TO RELATED APPLICATIONS

This application is a continuation of U.S. Pat. Application No. 15/139,743, filed on Apr. 27, 2016, entitled SYSTEMS AND METHODS FOR PLANNING AND OPTIMIZING THE MITIGATION OF POTENTIAL IMPACTS TO CRITICAL INFRASTRUCTURE OR KEY RESOURCES, which claims priority to and benefit of U.S. Provisional Application No. 62/153,148, entitled SYSTEMS AND METHODS FOR PLANNING AND OPTIMIZING THE MITIGATION OF POTENTIAL IMPACTS TO CRITICAL INFRASTRUCTURE OR KEY RESOURCES, filed, both of which are incorporated by reference herein in their entirety and for all purposes.

BACKGROUND

These teachings relate generally to systems and methods for planning and optimizing the mitigation of projected effects of possible disruptive events, whether natural or human-initiated, on critical infrastructure or key resources, which critical infrastructure or key resources may be damaged, the functionality of which may be otherwise altered or which may otherwise become unavailable as a result of the occurrence of such events.

Determining a plan for the optimal use of limited resources by governmental or other entities when preparing for a disruptive event, i.e., an event that has the potential to cause damage to or otherwise alter the functioning of critical infrastructure or key resources, or to render them unavailable, and executing such a plan within a specified period of time, which may only be a limited period of time before the event is expected to occur, requires (1) that the relative efficacy of alternative courses of action be evaluated; (2) that, once a course of action is selected, an optimized plan be developed for the employment of those limited resources; and (3) that the plan be monitored and updated as deemed appropriate during its execution to identify and react to deviations from the resources, workflow, schedule and other variables embodied in the plan. Although existing computer software (see, for example, the Touch Assisted Command and Control System (TACCS™), U.S. Pat. Application Serial No. 12/208,738, which is incorporated by reference herein in its entirety and for all purposes) can be utilized by appropriate computer systems to perform dynamic event-driven simulations that project the likely effects of disruptive events on critical infrastructure or key resources, no computer software is currently available to establish, and manage the execution of, an optimized plan for mitigating the projected effects of disruptive events on the critical infrastructure and key resources of a governmental or other entity as determined by these dynamic event-driven simulations so as to (1) incorporate priorities for mitigation activities that may be imposed by a governmental or other entity, or may be derived from processes, including processes such as the Threat and Hazard Identification and Risk Assessment, that may be employed by a governmental or other entity, (2) take into account the possible utilization of resources, which may include work crews, equipment, supplies, materials and other resources useful in mitigation efforts, that would be needed by or useful to, and would be under the control of, the governmental or other entity to perform mitigation activities in support of said plan, as well as take into account the possibility of supplementing those resources with additional and potentially available resources under the control of third parties, and (3) make changes to said plan on an as-needed basis and within a relatively short period of time based on the reporting and evaluation of circumstances that arise in the course of implementing the plan and based on the progress that is achieved (favorable or unfavorable) against the plan as the plan is implemented, including changes that may be caused by changes in the values of one or more of the variables used in determining the plan, such as the period of time within which the mitigation efforts must be concluded.

The lack of a system and methodology by which, in advance of a threatened or possible disruptive event, mitigation efforts can be optimized in a manner that is approved or directed by a governmental or other entity, while taking into account all available resources (including those under the control of third parties), has resulted in repeated errors in preparing for and responding to actual occurrences. Many examples are documented in the several studies reporting the shortfalls in the efforts to prepare for Hurricane Sandy. Among the shortfalls so identified, for instance, was a limited recognition that operational issues affecting drinking water and wastewater utilities would create cascading economic and environmental impacts. That limited recognition led to a failure to assign a high priority to preventive actions to mitigate risk, which in turn resulted in, among other things, lack of support in responding to requests for backup power and fuel. Significant benefits of the use of the teachings include the capability of identifying those critical infrastructure and key resources that, by virtue of the extent to which their operation is depended upon by many other critical infrastructure and key resources, ought to be assigned a high priority for mitigation activities; as well as the capability of being able to ensure that sufficient mitigation resources are dedicated to fully completing required mitigation activities within the period of time before a disruptive event is predicted to occur.

There is a need for methods and systems for planning and optimizing the efforts undertaken to mitigate the projected effects to critical infrastructure or key resources that may be damaged or otherwise altered or become unavailable as a result of possible disruptive events.

BRIEF SUMMARY

Systems and methods for planning and optimizing the mitigation of projected effects of possible disruptive events, whether natural or human-initiated, on critical infrastructure or key resources, which critical infrastructure or key resources may be damaged, the functionality of which may be otherwise altered, or which may otherwise become unavailable as a result of the occurrence of such events, are disclosed herein.

In one or more embodiments, the method of these teachings includes projecting, from execution of a computer readable code, at least one of the effects of the at least one predetermined environmental condition (i.e., a predetermined condition that may affect, directly or indirectly, the physical integrity, functional capability or availability of at least one critical infrastructure or key resource) associated with a possible natural or human-initiated disruptive event on one or more critical infrastructure or key resources, which the at least one effect would result from such critical infrastructure or key resource being subjected to said at least one predetermined environmental condition, and on other critical infrastructure or key resources dependent on the one or more critical infrastructure or key resources, each of the one or more critical infrastructure or key resources having rules to define the at least one effect of the at least one predetermined environmental condition and to define said dependencies, and being characterized by identifying the extent to which the at least one effect of the at least one predetermined environmental condition would be estimated to be reduced by the implementation of possible mitigation activities and identifying the time and resources estimated to be required to perform said mitigation activities; obtaining, from execution of a computer readable code, the identity of those critical infrastructure and key resources one or more of the at least one effects on which could be reduced by the implementation of one or more mitigation activities that could be accomplished by a predetermined number of work crews of predetermined sizes, capabilities and other characteristics (including travel capabilities and constraints of worker availability), each work crew having associated with it predetermined resources (each such work crew and associated resources being a mitigation asset) and having available to it other resources required to perform the one or more mitigation activities, each one of the predetermined work crews and its associated predetermined resources being staged, before deployment, at a predetermined staging location, and said other resources required to perform the one or more mitigation activities, which may be durables, including equipment, or consumables, being available from one or more locations, one or more of which may be a predetermined staging location; obtaining, from execution of the computer readable code, based on the relative priorities assigned to mitigating the at least one of the projected effects of the at least one of the predetermined environmental conditions on one or more critical infrastructure or key resources subjected to the at least one of the predetermined environmental conditions and based on the availability, locations, numbers and characteristics of the mitigation assets and other resources, a plan for deploying the mitigation assets and other resources, said plan to include a schedule indicating the mitigation activities to be achieved by deploying the mitigation assets and projecting the time of completion of such mitigation activities by the mitigation assets using necessary other resources; obtaining, from execution of the computer readable code, deployment information from the plan and schedule for performing one or more mitigation activities, and, using a human dispatcher, sequentially dispatch said mitigation assets to perform said mitigation activities in accordance with the plan and schedule; tracking, using the execution of the computer readable code, based on the actual progress of completion (for instance, dispatch to site, arrival on site, completion of mitigation activities and availability for further assignment) of mitigation activities, including mitigation activities not completed within the time indicated by the schedule by the mitigation assets assigned to mitigation activities, the resulting effect on the schedule of the planned performance of the mitigation activities yet to be performed by revising the said plan and schedule to reflect actual progress of the mitigation activities to date and the actual availability of mitigation assets and other resources; and identifying as appropriate, from execution of the computer readable code, the one or more likely causes of the effects to the schedule of mitigation activities and the one or more corrective actions, if any, that would be required to avoid future delays in the execution of the schedule and, if desirable, to restore the original schedule completion date, or the mitigation assets that would be made available by reason of mitigation activities being concluded more quickly or with more efficient use of resources than scheduled, including, when necessary, reperforming the above to establish and implement a revised plan and schedule.

In one or more embodiments, the system of these teachings includes one or more processors and one or more computer usable media having computer readable code embodied therein, which when executed in the one or more processors causes the one or more processors to perform the method of these teachings.

Other embodiments of the method and system of these teachings are disclosed herein.

For a better understanding of the present teachings, together with other and further objects thereof, reference is made to the accompanying drawings and detailed description, and its scope will be pointed out in the appended claims.

DETAILED DESCRIPTION

Figure 1:
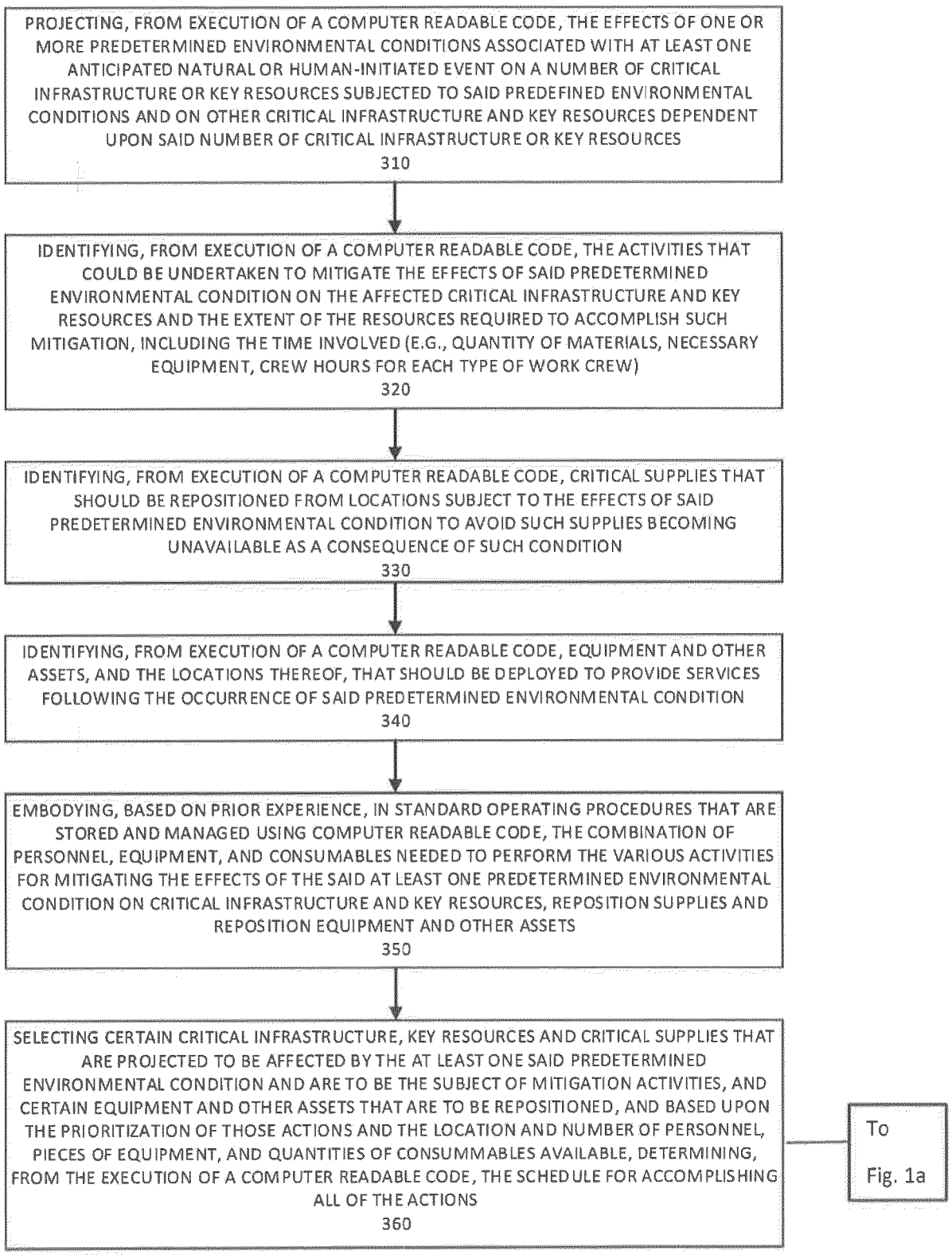
FIGS. 1,1a, are schematic flow diagram representations of an embodiment of the method of these teachings.

When presented with notice of an impending condition that may affect, directly or indirectly, the physical integrity, functional capability or availability of critical infrastructure or key resources, operations personnel resort to standard operating procedures (SOPs), which describe preventive measures that apply to all potentially impacted critical assets and key resources. As indicated by their very title (i.e., "standard operating procedures,") these SOPs are by necessity of general applicability and non-specific as to the exact nature of the assets at risk and the nature of risk to which these assets are exposed. The result is inefficient use of limited resources that results in less effective preparation then might otherwise be possible if decision makers were presented with more detailed information. These teachings provide a methodology by which this detailed information may be made available and effectively utilized by decision makers to mitigate the impact of such impending conditions.

The following is a detailed description of one of the best currently contemplated modes of carrying out these teachings. The description is not to be taken in a limiting sense, but is made merely for the purpose of illustrating the general principles of these teachings, since the scope of these teachings is best defined by the appended claims. Although the teachings have been described with respect to various embodiments, it should be realized these teachings are also capable of a wide variety of further and other embodiments within the spirit and scope of the appended claims.

As used herein, the singular forms "a," "an," and "the" include the plural reference unless the context clearly dictates otherwise.

In one or more embodiments, the method of these teachings includes projecting, from execution of a computer readable code, at least one of the effects of the at least one predetermined environmental condition (i.e., a predetermined condition that may affect, directly or indirectly, the physical integrity, functional capability or availability of at least one critical infrastructure or key resource) associated with a possible natural or human-initiated disruptive event on one or more critical infrastructure or key resources, which the at least one effect would result from such critical infrastructure or key resource being subjected to said at least one predetermined environmental condition, and on other critical infrastructure or key resources dependent on the one or more critical infrastructure or key resources, each of the one or more critical infrastructure or key resources having rules to define the at least one effect of the at least one predetermined environmental condition and to define said dependencies, and being characterized by identifying the extent to which the at least one effect of the at least one predetermined environmental condition would be estimated to be reduced by the implementation of possible mitigation activities and identifying the time and resources estimated to be required to perform said mitigation activities; obtaining, from execution of a computer readable code, the identity of those critical infrastructure and key resources one or more of the at least one effects on which could be reduced by the implementation of one or more mitigation activities that could be accomplished by a predetermined number of work crews of predetermined sizes, capabilities and other characteristics (including travel capabilities and constraints of worker availability), each work crew having associated with it predetermined resources (each such work crew and associated resources being a mitigation asset) and having available to it other resources required to perform the one or more mitigation activities, each one of the predetermined work crews and its associated predetermined resources being staged, before deployment, at a predetermined staging location, and said other resources required to perform the one or more mitigation activities, which may be durables, including equipment, or consumables, being available from one or more locations, one or more of which may be a predetermined staging location; obtaining, from execution of the computer readable code, based on the relative priorities assigned to mitigating the at least one of the projected effects of the at least one of the predetermined environmental conditions on one or more critical infrastructure or key resources subjected to the at least one of the predetermined environmental conditions and based on the availability, locations, numbers and characteristics of the mitigation assets and other resources, a plan for deploying the mitigation assets and other resources, said plan to include a schedule indicating the mitigation activities to be achieved by deploying the mitigation assets and projecting the time of completion of such mitigation activities by the mitigation assets using necessary other resources; obtaining, from execution of the computer readable code, deployment information from the plan and schedule for performing one or more mitigation activities, and, using a human dispatcher, sequentially dispatch said mitigation assets to perform said mitigation activities in accordance with the plan and schedule: tracking, using the execution of the computer readable code, based on the actual progress of completion (for instance, dispatch to site, arrival on site, completion of mitigation activities and availability for further assignment) of mitigation activities, including mitigation activities not completed within the time indicated by the schedule by the mitigation assets assigned to mitigation activities, the resulting effect on the schedule of the planned performance of the mitigation activities yet to be performed by revising the said plan and schedule to reflect actual progress of the mitigation activities to date and the actual availability of mitigation assets and other resources; and identifying as appropriate, from execution of the computer readable code, the one or more likely causes of the effects to the schedule of mitigation activities and the one or more corrective actions, if any, that would be required to avoid future delays in the execution of the schedule and, if desirable, to restore the original schedule completion date, or the mitigation assets that would be made available by reason of mitigation activities being concluded more quickly or with more efficient use of resources than scheduled, including, when necessary, reperforming the above to establish and implement a revised plan and schedule.

In one or more instances, the deployment information includes repositioning of other resources, which may consist of emergency equipment such as diesel generators, to a location, for instance, that better facilitates their use in conducting mitigation activities. In other instances, the method also includes the repositioning of other resources, which may consist of supplies that will be needed after the predetermined environmental condition has abated, to a location, for instance, that would better serve the purposes of the mitigation or recovery plan. In one embodiment, modifying the deployment information includes making available different or supplementary Mitigation Assets and other resources.

In one or more instances, projecting the at least one effect of the at least one predetermined environmental condition includes creating a network for each critical infrastructure and key resource, wherein each critical infrastructure or key resource is connected to other critical infrastructure or key resources upon which its continued operation directly depends, integrating networks of dependencies and interdependencies across a number of critical infrastructure and key resources, and, after the networks are completed for the number of critical infrastructure or key resources, simulating the imposition of the one or more environmental conditions over a geographic area containing at least one of the number of critical infrastructure or key resources. In one instance, in the above disclosed steps used for determining the at least one effect of the at least one predetermined environmental condition or in the above disclosed embodiment of the method of these teachings, the number of critical infrastructure and key resources and the other critical infrastructure and key resources are identified without using critical decision points (CDPs), CDPs being identified as moments where a decision has greater potential to affect an outcome.

In one embodiment, the at least one predetermined environmental condition corresponds to at least one actual environmental condition. In that embodiment, planning and optimizing the mitigation of the at least one effect of the at least one predetermined environmental condition that corresponds to at least one actual predetermined environmental condition on one or more critical infrastructure and key resources corresponds to disaster planning.

In one embodiment, the disruptive event giving rise to the at least one effect of the at least one predetermined environmental condition consists of a weather phenomenon, which at least one predetermined environmental condition may be simulated using existing computer software (see, for example, the Touch Assisted Command and Control System (TACCS™), U.S. Pat. Application Serial No. 12/708,738, which is incorporated by reference herein in its entirety and for all purposes) and appropriate computer systems to perform a dynamic event-driven simulation of such weather phenomenon as a forecasted occurrence, with locations projected to be affected to include the locations of one or more critical infrastructure or key resources.

Figure 1A:
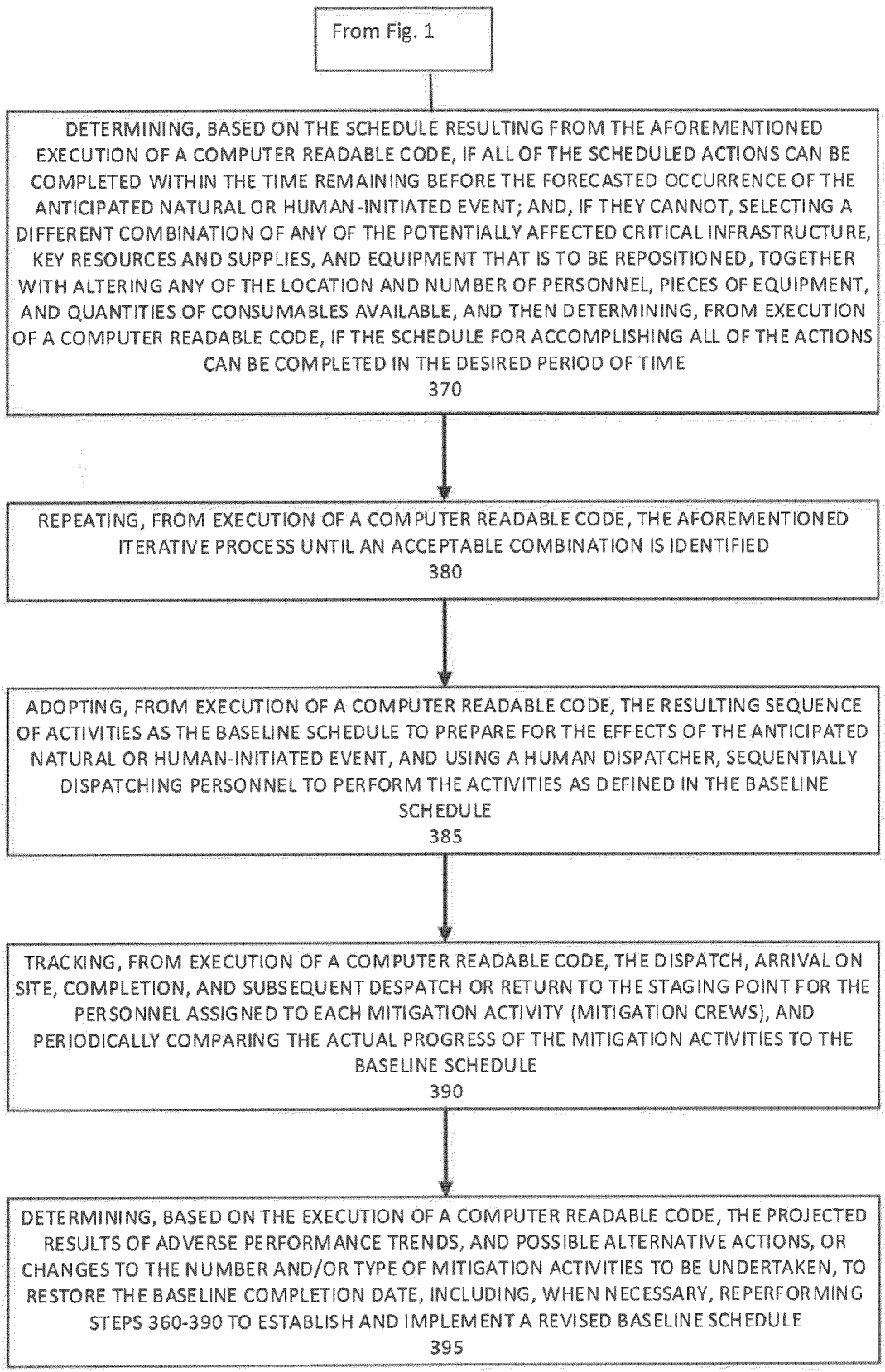

FIGS. 1, 1a are schematic flow diagram representations of an embodiment of the method of these teachings. Referring to FIGS. 1, 1a, in the embodiment shown therein, after execution of the computer readable code, where the computer readable code includes an event-driven simulation code (such as the Touch Assisted Command and Control System (TACCS™) which is disclosed in U.S. Pat. Application 12/208,738), the at least one effect of the at least one predetermined environmental condition associated with an anticipated natural or human-initiated disruptive event on one or more critical infrastructure or key resources subjected to the at least one predetermined environmental condition and on other critical infrastructure and key resources dependent on said number of critical infrastructure and key resources are projected (step 310, FIG. 1).

The critical infrastructure and key resources include those that are directly affected by the at least one predetermined environmental condition and those that are dependent on the directly affected critical infrastructure and key resources, each of the critical infrastructure and key resources having rules to define the effects on it of the at least one predetermined environmental condition and to define said dependencies, and being characterized by identifying the extent to which the at least one effect of said predetermined environmental condition would be estimated to be reduced by the implementation of possible mitigation activities and the time and resources estimated to be required to perform said mitigation activities (step 310, FIG. 1).

From execution of the computer readable code, after having projected the at least one effect of the at least one predetermined environmental condition, the affected critical assets and key resources for which mitigation is possible are identified, as well as the activities that would have to be undertaken to mitigate one or more of the effects, the extent of the Mitigation Assets available to accomplish the said mitigation, including the estimated time period involved, with the other resources (durables and consumables) being available. Performing the required mitigation activities requires Mitigation Assets that consist of work crews having required capabilities (e.g., plumbers, electricians and laborers) and their associated resources (e.g., specialized vehicles and other equipment), and may also require durables (e.g., general purpose generators, staging, mobile sanitary facilities and chain saws) or consumables (e.g., plywood, plastic sheeting and potable water) or both. The combination of the Mitigation Assets and other resources required to mitigate the at least one of the effects of the at least one predetermined environmental condition on different types of critical infrastructure and key resources may have been previously provided and embodied in standard operating procedures that are available through computer readable code (steps 320, 330, 340, 350, FIG. 1).

Based on the mitigation activities and the quantity and availability of Mitigation Assets, the schedule for performing all of the selected mitigation activities is determined from the execution of the computer readable code, based on mitigation priorities. (step 360, FIG. 1).

Critical infrastructure and key resources may also consist of storage locations for other resources (which may consist, for instance, of durables, for example diesel generators, decontamination stations, etc., or of consumables, for example bottled water, blankets, etc., that may be needed following the occurrence of the at least one predetermined environmental condition), each such storage location having the inventory of each type of resource available for use, and being characterized by the time and resources required to transfer the inventory items to a storage location that is projected to not be subject to the effects of the at least one predetermined environmental condition and from which said resources would be available for use, and the schedule may include actions to make those critical infrastructure and key resources less susceptible to the at least one predetermined environmental condition, for instance by performing one or more mitigation activities in place to protect the critical infrastructure or key resource against such condition, or by relocating the other resources to a place where they would not be subject to being adversely affected by such condition or to a place where they would otherwise better facilitate mitigation activities or event or post-event responses (step 370, FIG. 1a).

The resulting schedule can then be compared to the time remaining before the anticipated occurrence of the event expected to cause the at least one predetermined environmental condition to determine if the selected mitigation activities can be completed in the time available. If not, alternative combinations of mitigation activities and Mitigation Assets can be evaluated, using the process of the teachings, until an acceptable schedule results (step 380, FIG. 1a), such acceptability being determined by consideration of, among other things, of predetermined policies and procedures of the governmental or other entity and the effects of the projected implementation of such policies and procedures given the projected effects of the disruptive event.

The resulting schedule for the mitigation activities can then be used as the baseline mitigation schedule, which can be used by a human dispatcher to sequentially dispatch personnel to perform the mitigation activities as prescribed in the baseline schedule (step 385, FIG. 1a).

Once a Mitigation Asset has been actually dispatched, the progress of the Mitigation Asset can be tracked in numerous respects as it proceeds toward the completion of assigned mitigation activities based on actual performance, including the actual dispatch time, the time of arrival on site, the task completion time, and the time of return to the staging area, or, in the case of a resource that consists of a durable (e.g., a portable generator), the time such resource is available for further deployment (step 390, FIG. 1a). Tracking can be achieved, for instance, by exporting the schedule into a dispatching component that tracks, from the execution of a computer readable code, the progress of each Mitigation Asset to further monitor the baseline mitigation schedule.

The actual performance times may be periodically compared to the corresponding times in the baseline schedule, including but not limited to missed milestones, and for each Mitigation Asset, including travel time and task completion time (step 395, FIG. 1a).

Based on actual progress, the schedule for performing all of the remaining mitigation activities is determined from the execution of the computer readable code, and an updated projected completion date is determined (step 395, FIG. 1*a*).

If the new projected completion date is determined not to be acceptable (such determination being made, for instance, based on existing policies and procedures, or based upon the judgment of responsible individuals), the overall mitigation plan may be reconsidered in light of the identified changes in conditions and possible adjustments that may be made, and changes may thereafter be made in the different variable elements of the plan to achieve a more acceptable or desirable result in the performance of the remaining mitigation activities or potential additional activities, resulting in the issuance of a revised plan and schedule using the method of the teachings (step 395, FIG. 1).

In one embodiment of the teachings, upon the completion of mitigation activities, the circumstances and decisions involved in implementing such activities may be reviewed and lessons learned identified, which lessons may be incorporated in procedures embodied in executable computer code so as to be available in the case of future disruptive events (step 395, FIG. 1*a*).

In one or more embodiments, the system of these teachings includes one or more processors and one or more computer usable media having computer readable code embodied therein, which when executed in the one or more processors causes the one or more processors to perform the method of these teachings.

Figure 2:
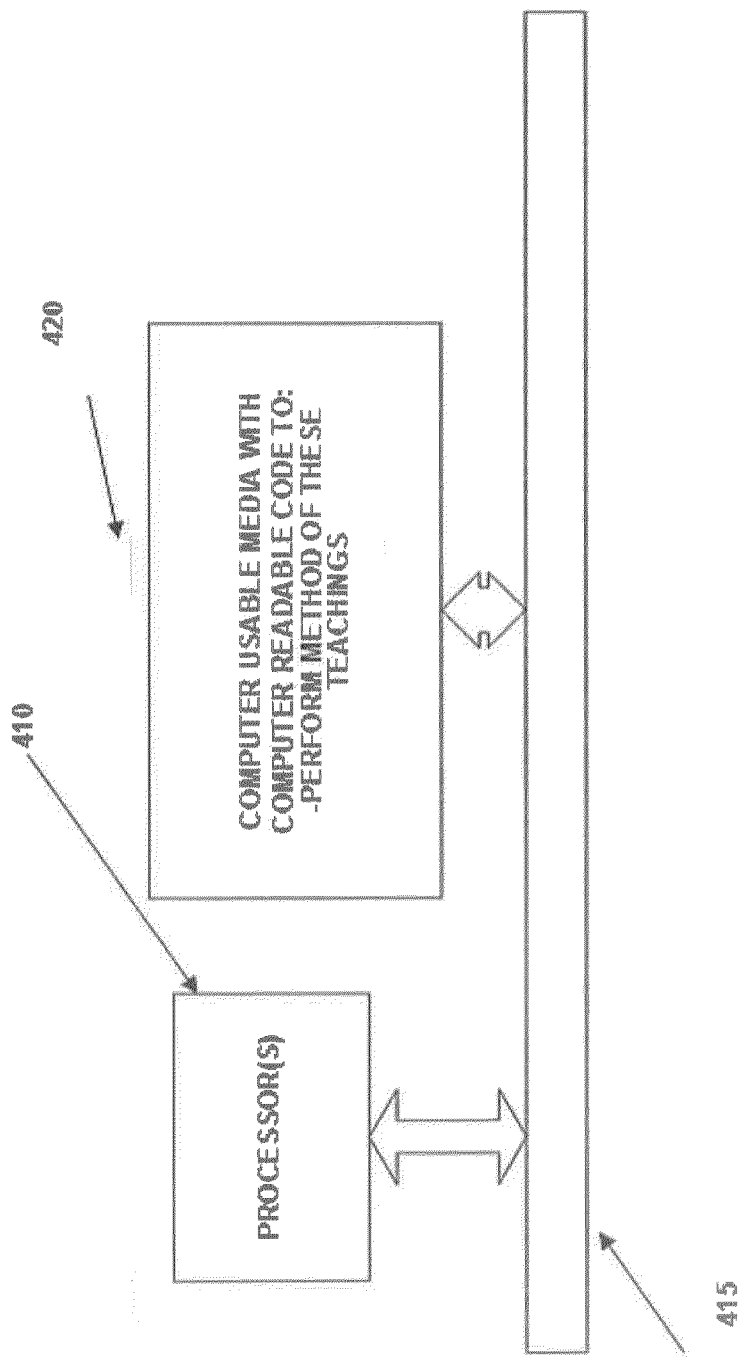
FIG. 2 is a schematic block diagram representation of an embodiment the system of these teachings.

FIG. 2 is a schematic block diagram representation of an embodiment the system of these teachings. Referring to FIG. 2, in the embodiment shown therein, one or more processors 410 are operatively connected to computer usable media 420 that has computer readable code embodied therein, which when executed by the processors 410 causes of processors to perform their method of these teachings, in one embodiment the method disclosed hereinabove. The one or more processors are operatively connected to the computer usable media 420 by a computer interconnection component 415 (such as a computer bus).

Figure 3:
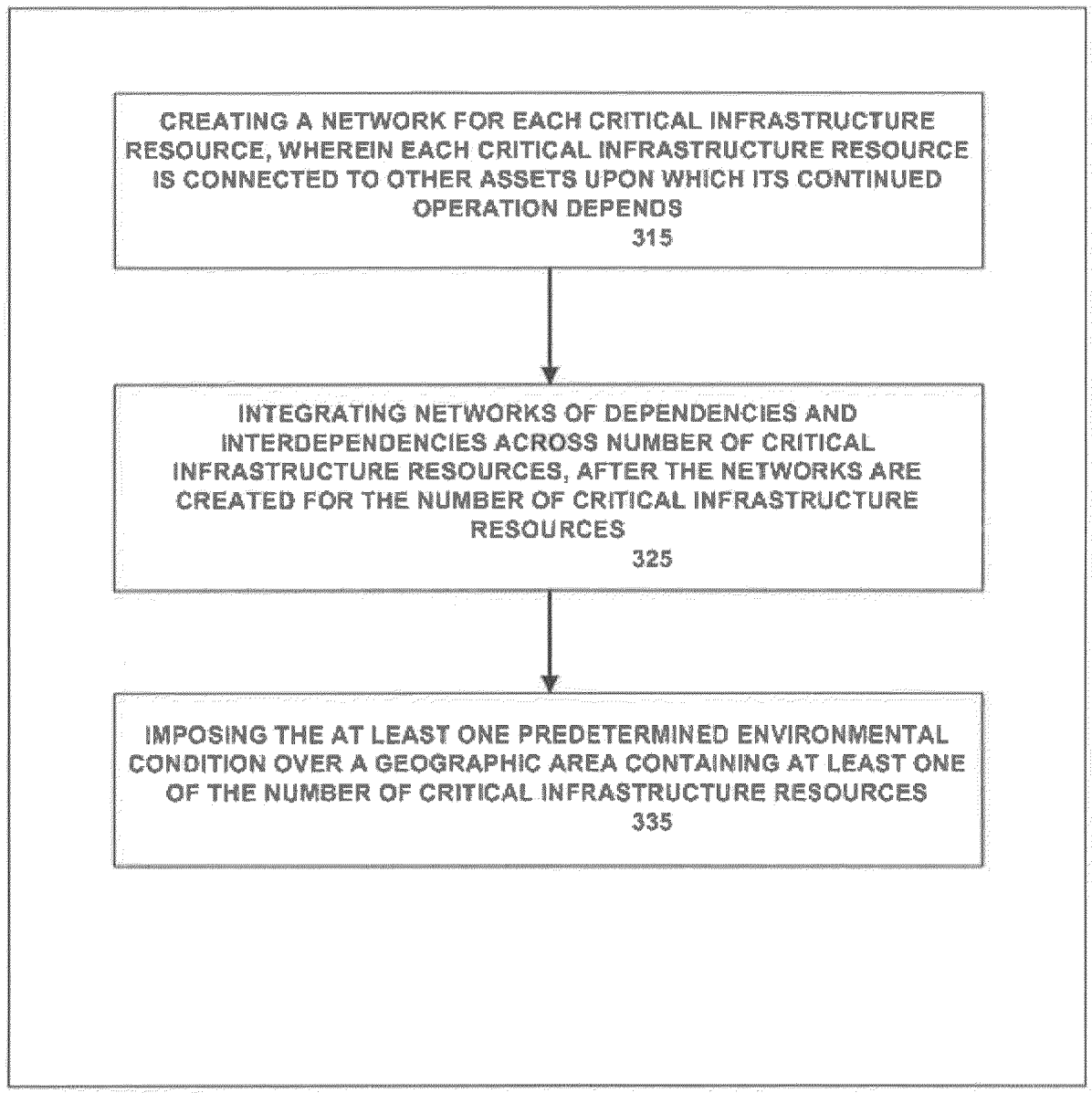
FIG. 3 is a schematic flow diagram representation of an instance of the step of determining the projected effects of one or more predetermined environmental conditions on a number of critical infrastructure or key resources.

FIG. 3 is a schematic flow diagram representation of an instance of the step of determining the at least one effect of the at least one predetermined environmental condition on one or more critical infrastructure and key resources. In the embodiment shown in FIG. 3, determining at least one effect of the at least one predetermined environmental condition includes creating a network for each critical infrastructure and key resource, wherein each critical infrastructure and key resource is connected to each of the other assets upon which its continued operation directly depends (step 315, FIG. 3), integrating networks of dependencies and interdependencies across number of critical infrastructure and key resources, and, after the networks are created for the number of critical infrastructure and key resources (step 325, FIG. 3), imposing the at least one predetermined environmental condition over a geographic area containing one or more of the critical infrastructure and key resources (step 335, FIG. 3). Each of the steps in the instance shown in FIG. 3 are performed by executing, by means of one or more processors, the computer readable code.

Figure 4:
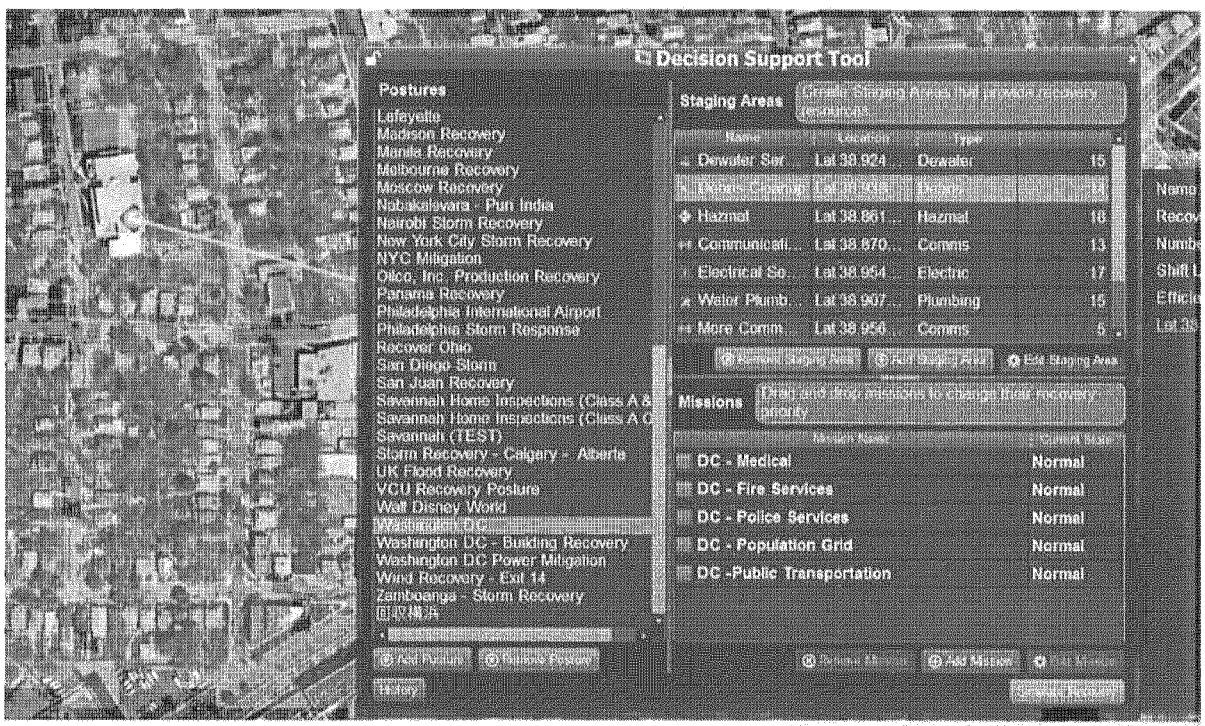
FIG. 4 is a screenshot showing the assignment of mitigation/recovery crews to predetermined staging areas.

FIG. 4 is a screenshot from one embodiment of the teachings that shows several mitigation/recovery work crews, each work crew having different capabilities and each being assigned to a predetermined staging area identified by latitude and longitude. Additional work crews may be added by adding additional staging areas (which may be the same as or different from already existing staging areas), and work crews may be deleted by removing a staging area (the effect of which is to remove the designated work crew only, not all of the work crews that may be located at a specific staging area).

Figure 5:
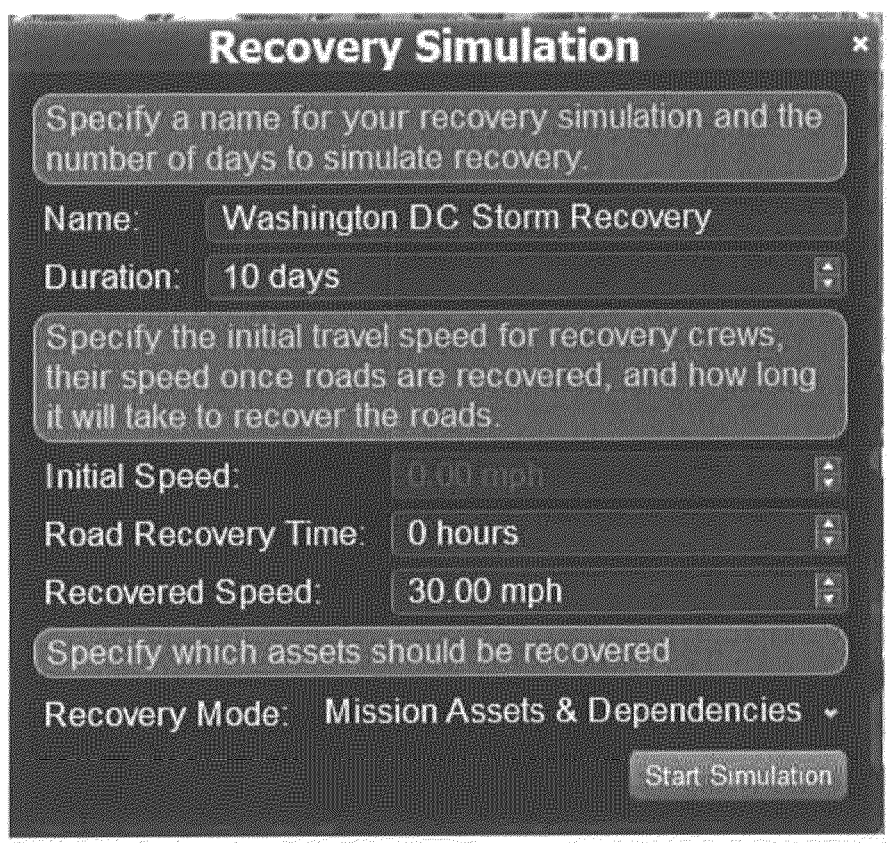
FIG. 5 is a screenshot showing the panel that starts the simulation of the mitigation activities and enables the operator to specify the speed to be used in calculating travel times from the predetermined staging area to the mitigation site.

FIG. 5 is a screenshot that shows the user interface by which the operator may start the simulation that plans the desired mitigation activities. The duration entry enables the operator to specify the period within which the mitigation activities are intended to be performed in full. The recovered speed entry enables to operator to set the speed with which Mitigation Assets reach the affected critical infrastructure or key resource from the predetermined staging area or other location. The road recovery time is always 0 mph in mitigation because the roads have not yet been affected by the at least one predetermined environmental condition.

Figure 6:
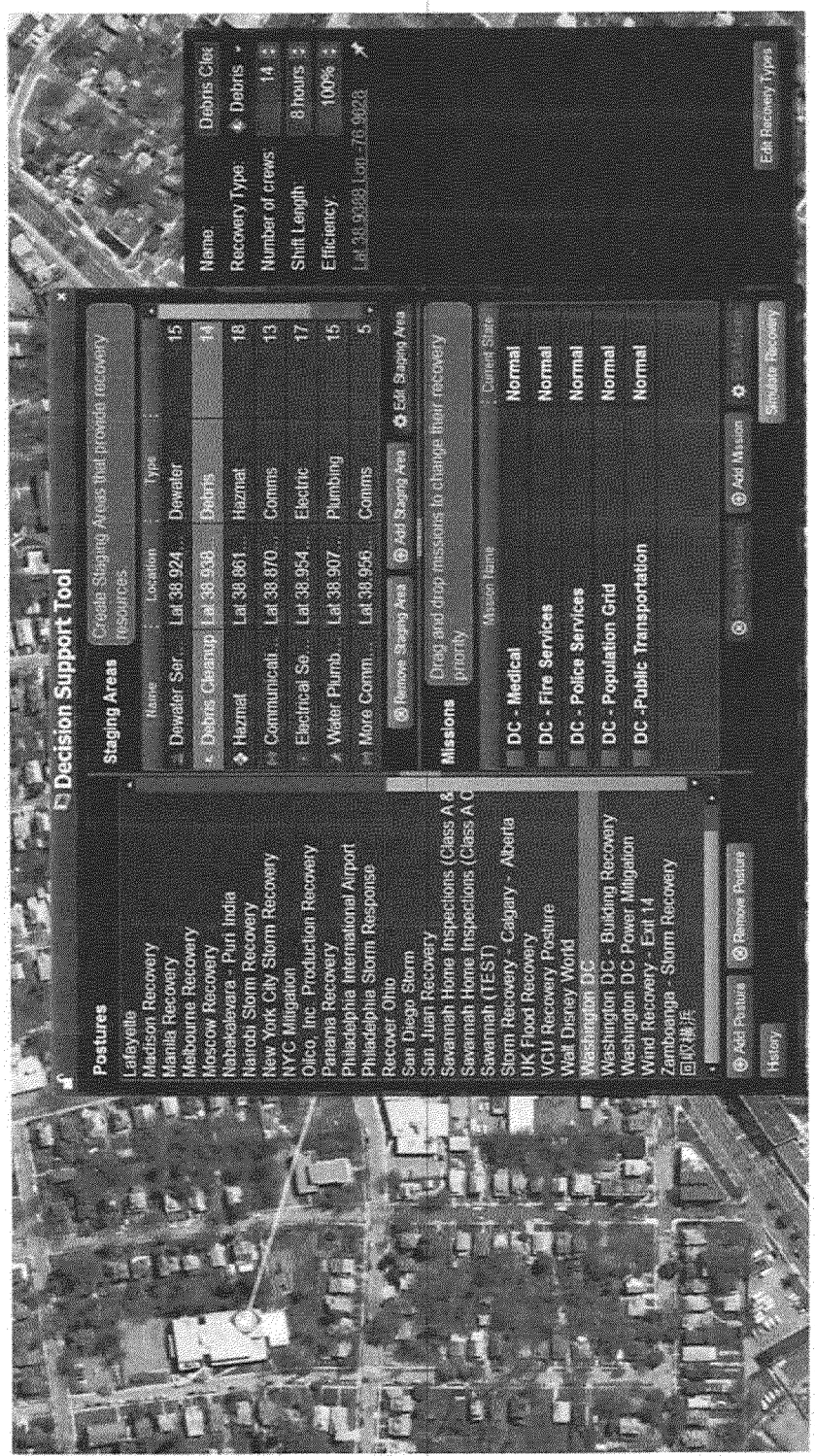
FIG. 6 is a screenshot showing mitigation activities (tasks) assigned to work crews.

FIG. 6 is a screenshot that shows a series of mitigation activities (tasks) that have been assigned to particular work crews (Mitigation Assets) to be performed. The work crews may be designated in a manner selected by the operator (in the case of the screenshot, by the name of the work crew chief or the individual in charge of a particular staging area). The screenshot also shows the teachings providing the status of the various assigned tasks.

A summary description of the TACCS™ software, as disclosed in U.S. Pat. Application 12/208,738, is presented hereinbelow. The TACCS™ software, as disclosed in U.S. Pat. Application 12/208,738, is an event driven simulation software and does not use critical decision points (CDPs), CDPs being identified moments where a decision has greater potential to affect an outcome.

In event driven simulations, as stated in section 10.2 of chapter 10 of the book Discrete Event Simulation and System Dynamics for Management Decision Making, ISBN 978-1-118-34902-1, 2014, which is incorporated by reference herein in its entirety and for all purposes, one stops making simulations with different policies and procedures when the "client" arrived at the decision that the "client" wants to take. One skilled in the art would know that these simulations differ from mathematical type simulations, the latter being simulations in which convergence criteria are provided.

Figure 7:
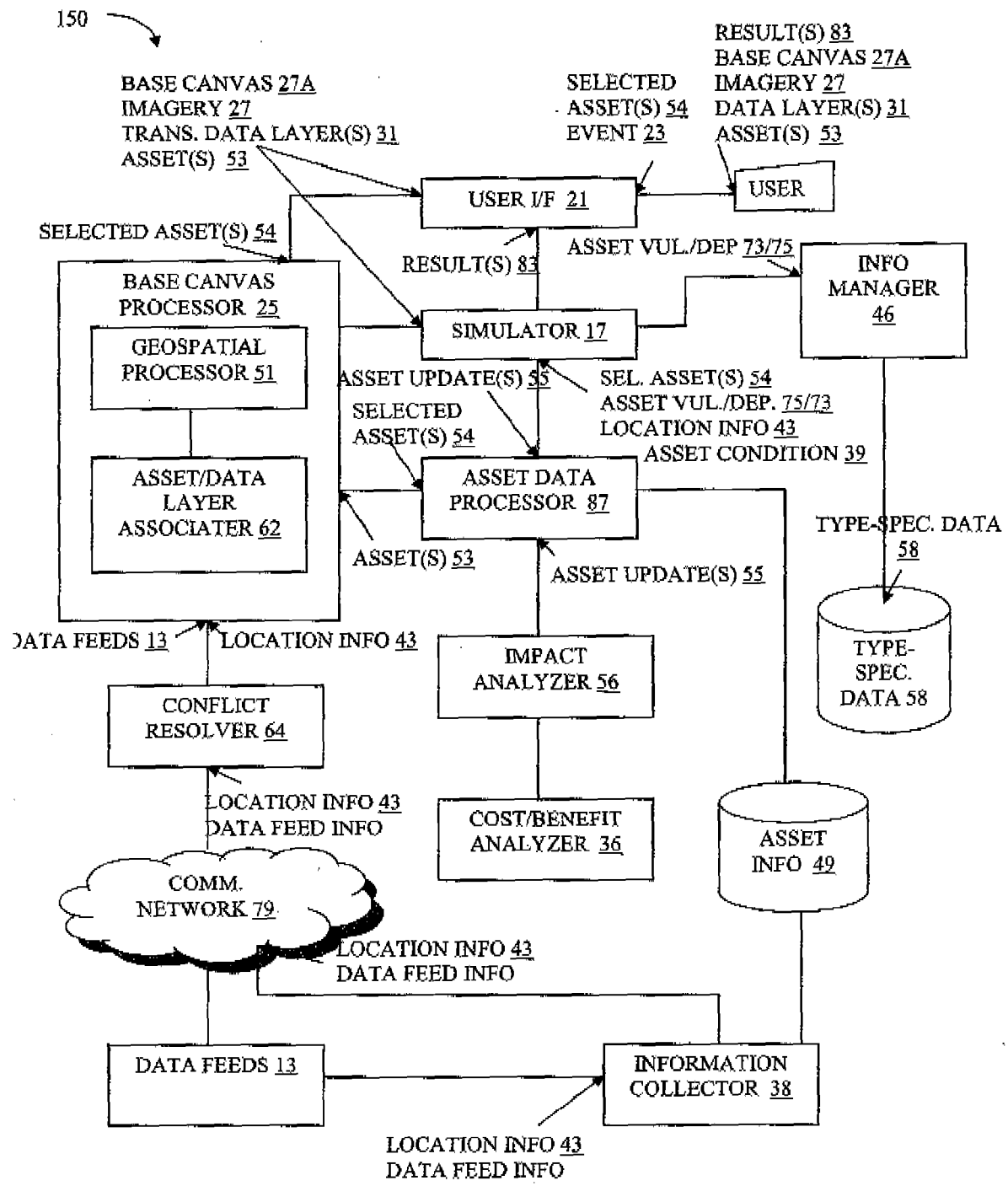
FIG. 7 is a schematic block diagram of the components of the event system of the present teachings.

Referring now to FIG. 7, system 150 for training personnel to respond to event 23, or for creating and testing policies and procedures to respond to event 23, or for responding to event 23 can include, but is not limited to including, information collector 38 determining location information 43 and assets 53 associated with event 23, base canvas processor 25 creating base canvas 27A using at least one data feed 13, location information 43, and information associated with assets 53. Base canvas 27A can have imagery 27 and at least one data layer 31 that is overlain upon base canvas 27A. Base canvas processor 25 can continuously update at least one data layer 31 with information from at least one data feed 13. System 150 can further include geospatial processor 51 correlating and geospatially aligning at least one data layer 31 with imagery 27 and base canvas 27A according to location information 43. System 150 can also include asset/data layer associater 62 identifying assets 53 associated with location information 43 and associating assets 53 with at least one data layer 31, user interface 21 receiving selected assets 54 from assets 53 from a user who is interfacing with at least one data layer 31 provided by base canvas processor 25 while base canvas processor 25 aggregates data from at least one data feed 13 associated with assets 53, and asset data processor 87 identifying asset dependencies 73 and asset vulnerabilities 75 associated with selected assets 54. System 150 can still further include an interdependency network used by simulator 17 which simulates event 23 based on selected assets 54, location information 43, asset condition 39, base canvas 27A, at least one data layer 31, asset vulnerabilities 75, asset dependencies 73, and asset behaviors. Simulator 17 can update asset conditions 39 based on the simulation, and simulator 17 can send results 83 of the simulation to user interface 21. Simulator 17 can continue the simulation until the training is complete, or until the policies and procedures are created or tested, or until the event has concluded.

Figure 8:
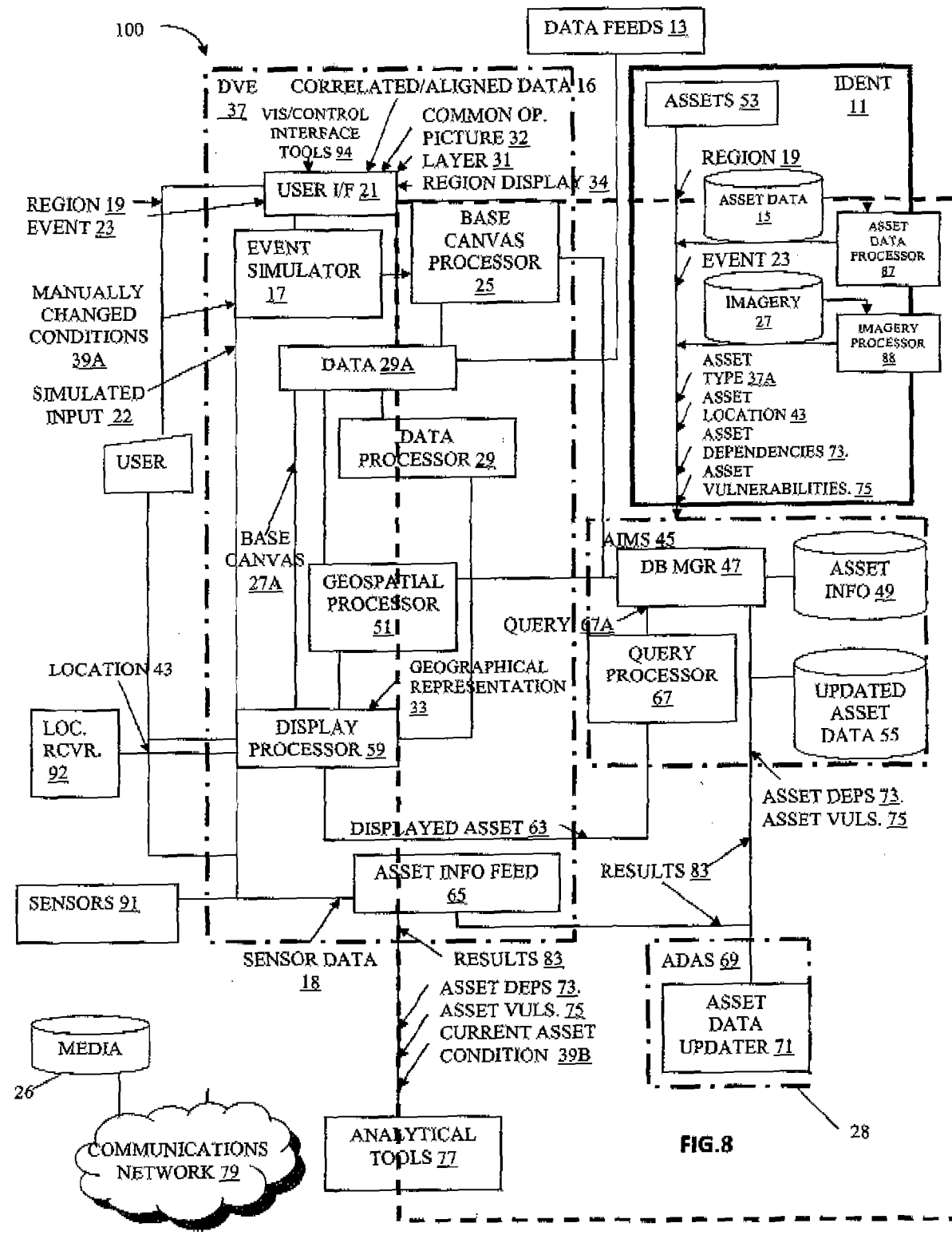
FIG. 8 is a schematic block diagram of an exemplary embodiment of the event system.

Continuing to refer primarily to FIG. 7, system 150 can optionally include information manager 46 grouping assets 53 according to an asset type 37A, automatically deriving dependency, vulnerability, and behavior information from assets 53 based on asset type 37A (FIG. 2), and storing dependency, vulnerability, and behavior information as asset-specific or type-specific data 58 on computer-readable medium 26 (FIG. 8). System 150 can further optionally include conflict resolver 64 identifying and resolving conflicts among information received from a plurality of data feeds 13, each containing analysis information. Base canvas processor 25 can superimpose the resolved data feeds on at least one data layer 31. System 150 can also optionally include impact analyzer 56 anticipating at least one impact based on asset condition 39, asset dependencies 73, asset vulnerabilities 75, and asset behaviors, updating asset conditions 39 according to an effect of at least one impact on selected assets 54, and providing a notification to the user by flagging assets 53 with changed data or changed asset conditions. Simulator 17 can simulate event 23 based on selected assets 54, location information 43, asset condition 39, and updated assets 55, and can update updated assets 55 and asset condition 39 based on the simulation. System 150 can optionally include cost/benefit analyzer 36 choosing a change to selected assets 54 based on a cost/benefit analysis of updated assets 55.

Referring now to FIG. 8, system 100 can create common operating picture 32 that can be understood by culturally disparate public and private agencies and organizations to train decision makers by allowing them to view results of their actions in a simulated environment, and to manage unexpected events in a command and control environment. System 100 can provide the ability to display asset location information 43, aggregate asset data 15 obtained from multiple sources and display/visualize these aggregated data, identify asset dependencies 73 and vulnerabilities 75, and utilize analytical tools 77 to perform disruption impact analyses. System 100 can be used to develop and test policies and procedures to respond to unexpected events 23 such as, for example, terrorist events and natural disasters, and can train decision makers by allowing them (1) to view results 83 of their actions in a simulated environment, and (2) to manage unexpected events 23 in a command and control environment.

Continuing to refer to FIG. 8, system 100 can include, but is not limited to including, identification process 11 configured to identify, classify or typify, locate, and understand what is Critical Infrastructure/Key Resources (CI/KR) known herein also as key assets and what is not. Identification process 11 can include, but is not limited to determining the vulnerabilities and dependencies of selected CI/KR assets, and selecting the best source of imagery to utilize as a base canvas for visualizing event scenarios. Identification process 11 can include imagery processor 88 which can optimally incorporate images ranging from simple charts or diagrams to complex images from sources such as, for example, Geographic Information System (GIS) databases, data management tools, for example, ESRI® ARCGIS®, streaming feeds, for example, DIGITALGLOBE™, and other complex data sources, and can provide structure to the complexity of CI/KR and its classification or organization into asset types 37A. System 100 can also include automated data aggregation system (ADAS) 69 configured to determine who owns a critical infrastructure or asset 53 and how to contact the owner of asset 53. ADAS 69 can also be configured to collect geospatial, public, internet, internal, private, and official raw data.

Continuing to still further refer to FIG. 8, system 100 incorporates analytical tools 77 including the, which can be configured to identify the effects that result from interdependencies between infrastructure components. Interdependencies can include physical/direct linkages, indirect (geospatial) linkages, policy/procedural dependencies, informational dependencies, societal dependencies, and supply chain dependencies.

Continuing to still further refer to FIG. 8, system 100 can also include data visualization engine (DVE) 37 configured to integrate received data into one visual network and serve as common operating picture 32 for command and control. DVE 37 can be configured to illustrate the consequences based on a behavior attribute. DVE can be configured to acquire two dimensional and/or three dimensional imagery of an area of interest, thereby creating an easily understood functional canvas which can be subsequently used to present asset data and the results of analyses. Data resolution requirements can vary depending on the nature of the analysis. Imagery types can include charts, diagrams, three dimensional structures, topographical mapping, orthophoto production, planimetric mapping, digital elevation models, and terrain modeling.

Continuing to still further refer to FIG. 8, system 100 can also include asset information management system (AIMS) 45 configured to provide structure, an asset catalog, security, fast access, and flexible and expandable storage. AIMS intelligently manages CI/KR information, asset details, and vulnerabilities and dependencies and their effect on the performance of an asset 53, such as, for example, required inputs, outputs produced, sustainability, sensitivities, consequences of failure, and recovery limitations. Based on this analysis, other assets that impact the function of the critical assets can be identified and added to asset information database 49. For example, input for a diesel generator might include diesel fuel lubricating oil, cooling water, Supervisory Control and Data Acquisition (SCADA) for automatic startup, and human activity for manual startup; output might include exhaust and electricity; and vulnerabilities might include high water level due to flooding and vibration damage due to a seismic event.

Continuing to still further refer to FIG. 8, identification process (IDENT) 11 can be utilized to, for example, (1) identify region 19 of interest and at least one disaster or disruptive event 23, (2) obtain imagery 27 to prepare base canvas 27A and three dimensional data 29A associated with region 19 of interest, (3) identify a plurality of assets 53 required to respond to the at least one disaster or disruptive event 23, and (4) identify asset dependencies 73 and asset vulnerabilities 75. DVE 37 can be configured to, for example, (1) prepare base canvas 27A and the three dimensional data 29A associated with region 19 of interest, (2) superimpose asset data 15 in a manner that it appears to the user, for example by user interface 21, as data layer 31 for each of the asset types 37A, (3) superimpose graphical representations 33 associated with assets 53, (4) create region display 34 including base canvas 27A, the plurality of data layers 31, data feeds 13, graphical representations 33, and control interface tools 94, (5) display region display 34, (6) geospatially align the plurality of data layers 31 and data feeds 13 with base canvas 27A according to location information 43, (7) enable manipulation of region display 34 in order to view selected areas, display assets 53 and associated graphical representations 33 in the selected areas, (8) provide asset dependencies 73, asset vulnerabilities 75, disaster or disruptive event assets 53, sensor data 18, and current asset condition 39B, to analytical tools 77 through asset information feed 65, (9) receive results 83 from analytical tools 77, (10) determine current asset condition 39B based on results 83, and (11) retrieve, aggregate and display asset data 15 from displayed assets 63 using display processor 59.

Continuing to still further refer to FIG. 8, AIMS 45 can be configured to, for example, (1) manage, by, for example, database manager 47, the retrieval and/or storage of asset information 49, and information stored in external databases, (2) store asset data 15, and updated assets 55, (3) store asset information 49, which may include asset data 15, asset location information 43, asset dependencies 73, and asset vulnerabilities 75, (4) receive query 67A of displayed assets 63, (5) retrieve, by, for example, query processor 67, asset information 49 associated with displayed assets 63 based on query 67A, (6) receive results 83 from analytic tools 77, and (7) update asset data 15 forming updated assets 55 based on results 83. ADAS 69 can be configured to, for example, (1) obtain updated assets 55 from asset data updater 71 by comparing query results from query 67A to asset information 49, and (2) obtain information about assets 53 within region 19. AIMS 45 and DVE 37 can be configured to train personnel, test policies and procedures associated with disaster or disruptive event 23, and provide common operating picture 32 for command and control of disaster or disruptive event 23 by using sensor data 18 from sensors 91, simulated input 22, or manually changed conditions 39A to determine current asset condition 39B associated with disaster or disruptive event 23, by feeding displayed assets 63, asset dependencies 73, and asset vulnerabilities 75 to analytical tools 77, and by replacing asset data 15 with updated assets 55 and repeating these steps as disaster or disruptive event 23 evolves, providing results 83 that can be shared, for example, by communications network 79, among multiple displays and used to coordinate and control a response to disaster or disruptive event 23, including deploying and tracking assets based on location information 43 received from location receiver 92.

Continuing to still further refer to FIG. 8, an example of the use of system 100 is an urban setting in which the availability of care during and after flooding in proximity to a hospital is of concern. Factors that could influence the availability of care can include availability of electric power, ability to sustain operation after loss of power, and access to the hospital. After system 100 is executed, during an after action review, it could be found that the simulation indicates that current system architectures do not take into account the consequences of power supply interdependencies. System 100 can be used to identify architecture redesign aspects such as, for example, having portable standby dewatering pumps that could be brought to bear, having an alternative source of power to the pump, hardening the substation to prevent water ingress, increasing fuel storage at the hospital, having a means of fuel delivery that does not require the use of the main access routes, having a second source of power to the hospital, and carrying fuel to the hospital on boats. After the cost/benefit analysis of possible remedial actions is complete, system 100 can be provided with the information as modified by the result of the cost/benefit analysis, and can be used to simulate the flooding event again.

Figure 9A:
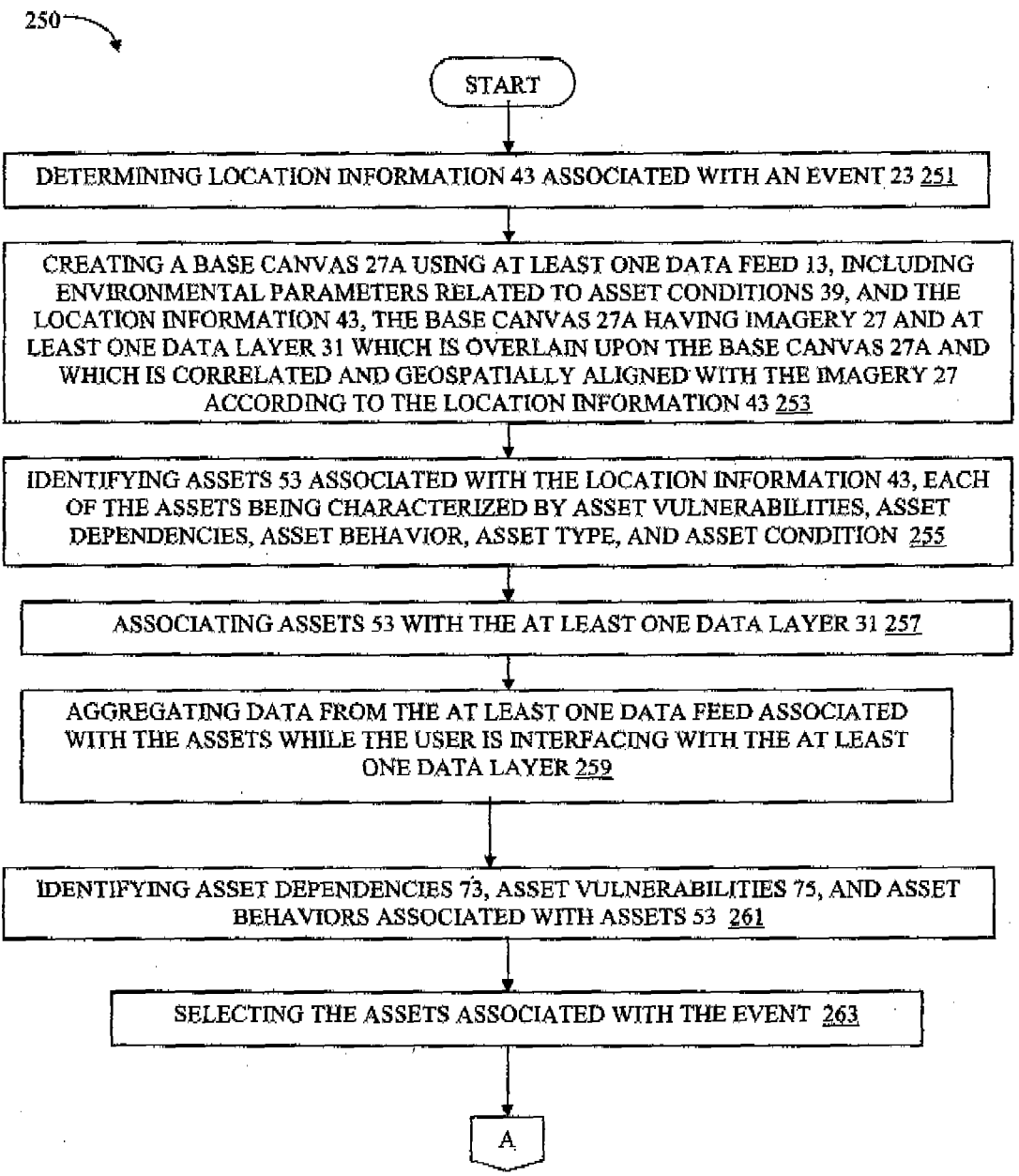
FIGS. 9A-9B are flowcharts of the method of the present teachings.
Figure 9B:
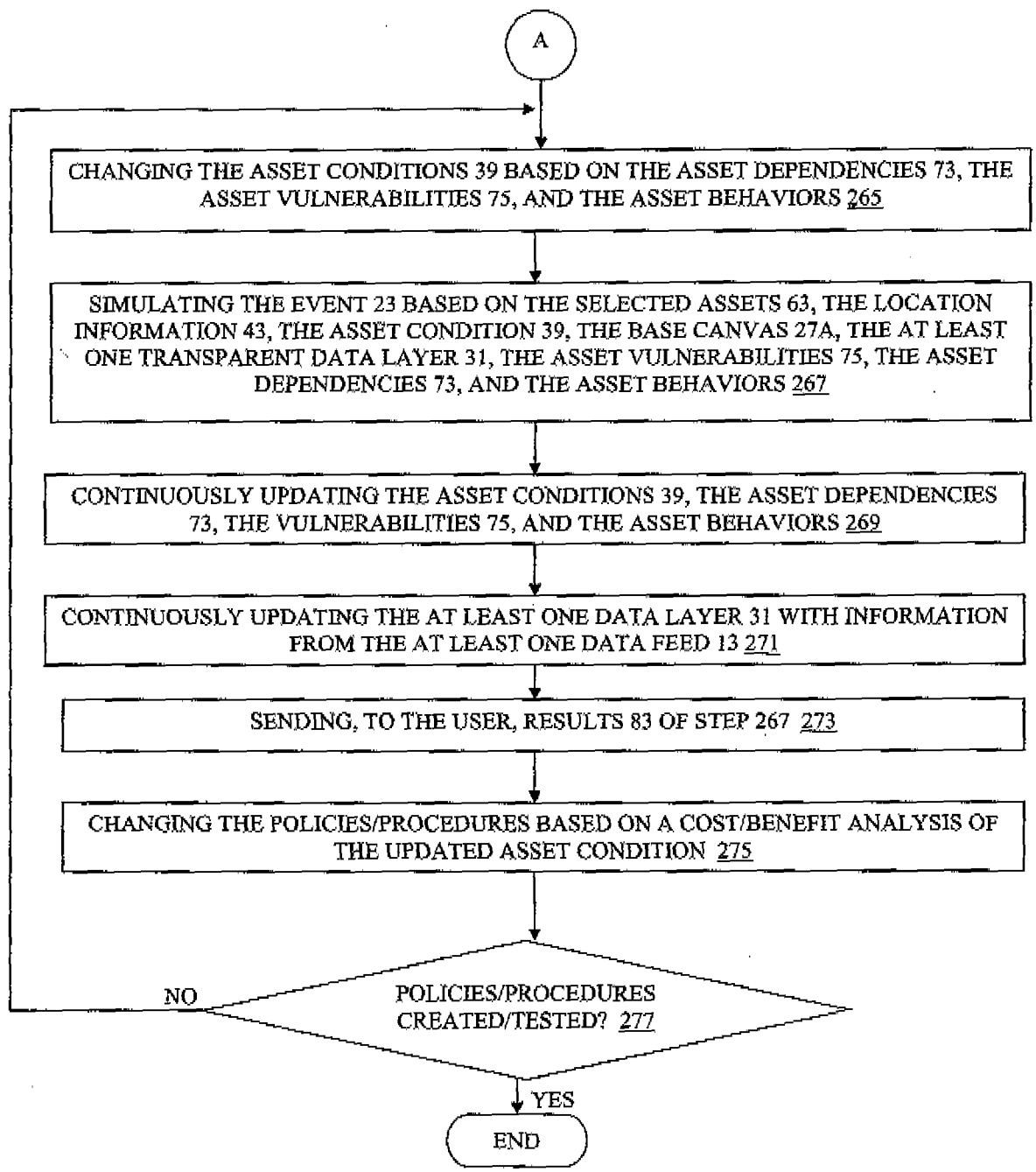

Referring primarily to FIGS. 9A-9B, method 250 for creating and testing procedures/policies to respond to an event 23 can include, but is not limited to including, the steps of (a) determining 251 location information 43 associated with event 23, and (b) creating 253 base canvas 27A using at least one data feed 13, which can include, but is not limited to including, environmental parameters related to asset conditions such as, for example, ambient temperature, and location information 43. Base canvas 27A can include imagery 27 and at least one data layer 31 which can be overlain upon base canvas 27A and which can be correlated and geospatially aligned with imagery 27 according to location information 43. Method 250 can also include the steps of (c) identifying 255 assets 53 associated with location information 43, each of the assets being characterized by asset vulnerabilities, asset dependencies, asset behavior, asset type, and asset condition, (d) associating 257 assets 53 with at least one data layer 31, (e) aggregating 259 data from at least one data feed 13 associated with assets 53 while the user is interfacing with at least one data layer 31, and (f) identifying 261 asset dependencies 73, asset vulnerabilities 75, and asset behaviors associated with assets 53. Method 250 can also include the steps of (g) selecting 263 assets 53 associated with event 23, (h) changing 265 asset condition 39 based on asset dependencies 73, asset vulnerabilities 75, and asset behaviors, and (i) simulating 267 event 23 based on selected assets 54, location information 43, asset condition 39, base canvas 27A, at least one data layer 31, asset vulnerabilities 75, asset dependencies 73, and asset behavior. Method 250 can still further include the steps of (j) continuously updating 269 asset condition 39 based on asset vulnerabilities 75, asset dependencies 73, and asset behaviors, (k) continuously updating 271 at least one data layer 31 with information from the at least one data feed 13, (l) sending 273 results 83 of the step of simulating to the user, (m) changing 275 the policies/procedures based on a cost/benefit analysis of the updated asset condition, and repeating 277 steps (h) - (m) until the policies and procedures are created and tested.

Method 250 can optionally include the steps of recording asset dependencies 73 and asset vulnerabilities 75 on computer-readable medium 26, grouping assets 53 according to asset type 37A, automatically deriving type-specific data from assets 53 based on asset type 37A, and storing the asset-specific or type-specific data on computer-readable medium 26. Method 250 can also optionally include the step of applying visualization and control interface tools 94 so that assets 53 appear to the user to be operating in the at least one data layer 31. Method 250 can still further optionally include the steps of identifying an alternate group of data feeds from data feeds 13, identifying and resolving conflicts among information received from data feeds 13 and the alternate group using predetermined algorithms, identifying specific data feeds from data feeds 13 that contain analytical information, and superimposing the analytical information on at least one data layer 31.

Figure 10A:
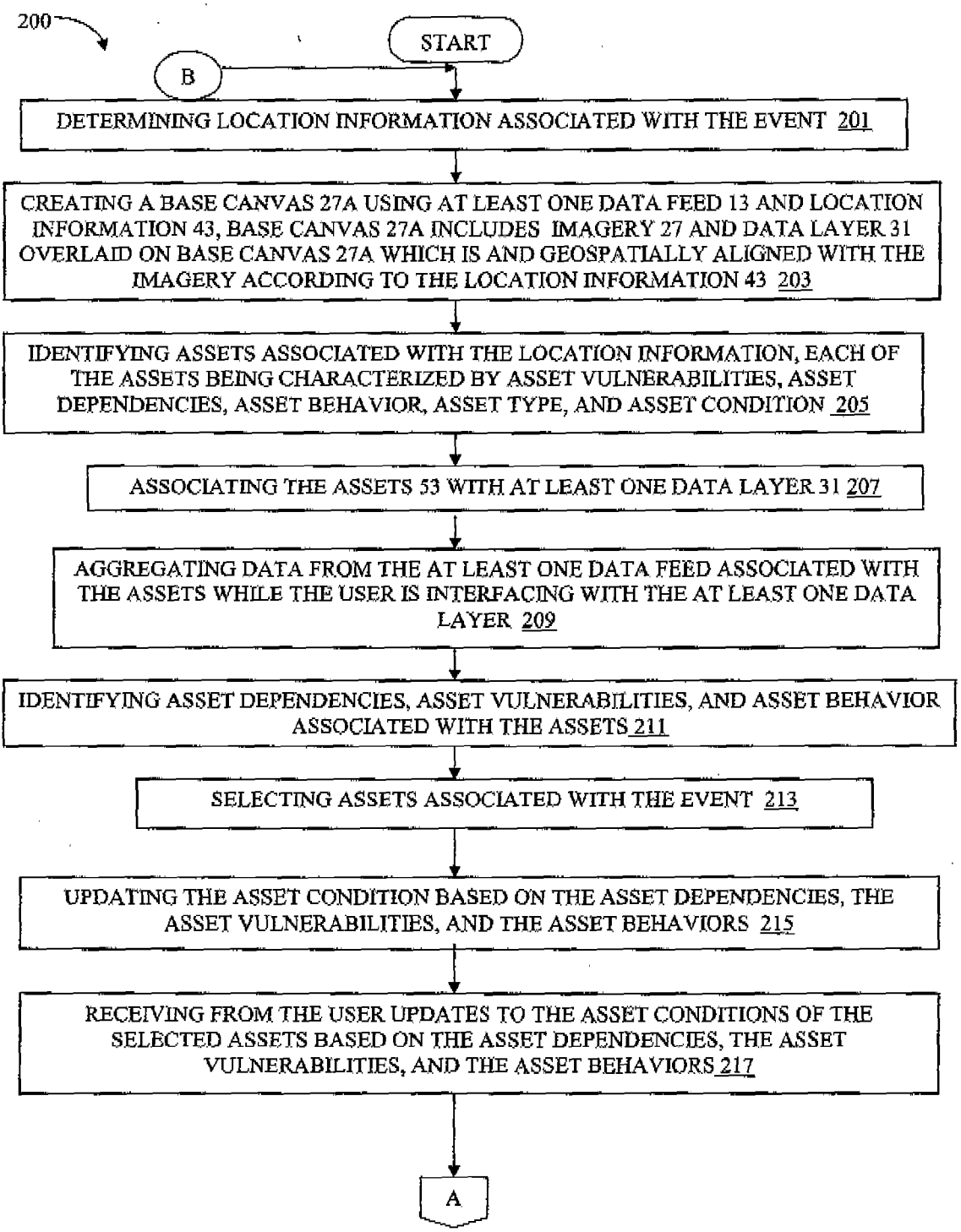
FIGS. 10A-10B are flowcharts of an illustrative method of use of the system of the present teachings for training and policy development.
Figure 10B:
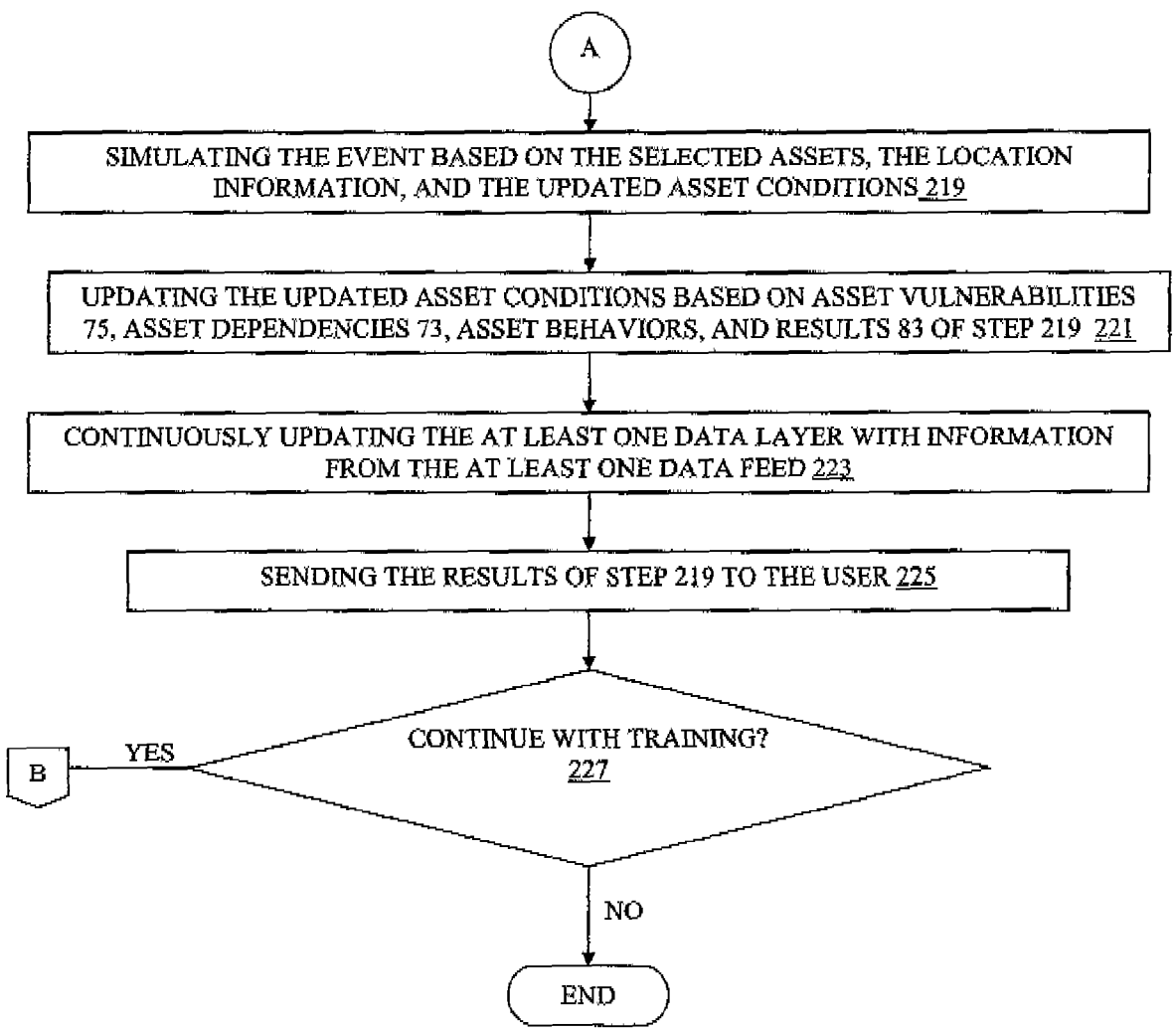

Referring now primarily to FIGS. 10A-10B, method 200 for training personnel to respond to an event 23 can include, but is not limited to including, the steps of (a) determining 201 location information 43 associated with event 23, and (b) creating 203 base canvas 27A using at least one data feed 13 and location information 43. Base canvas 27A can include imagery 27 and at least one data layer 31 overlain upon base canvas 27A which is correlated and geospatially aligned with imagery 27 according to location information 43, (c) identifying 205 assets 53 associated with location information 43, each asset 53 being characterized by asset vulnerabilities 75, asset dependencies 73, asset behavior, asset type 37A, and asset condition 39, (d) associating 207 assets 53 with at least one data layer 31, and (e) aggregating 209 data from at least one data feed 13 associated with the assets 53 while the user is interfacing with at least one data layer 31. Method 200 can also include the steps of (f) identifying 211 asset dependencies 73, asset vulnerabilities 75, and asset behavior associated with assets 53, (g) selecting 213 assets 53 associated with event 23, (h) updating 215 asset condition 39 based on asset dependencies 73, asset vulnerabilities 75, and asset behaviors, (i) receiving 217 from the user updates to asset conditions 39 of selected assets 54 based on asset dependencies 73, asset vulnerabilities 75, and asset behaviors. Method 200 can further include the steps of (j) simulating 219 event 23 based on selected assets 54, location information 43, the updated asset conditions, (k) updating 221 the updated asset conditions based on asset vulnerabilities 75, asset dependencies 73, asset behaviors, and results 83 of step (j), (l) continuously updating 223 at least one data layer 31 with information from at least one data feed 13, (m) sending 225 results 83 of step (j) to the user, and (n) repeating 227 steps (i) - (m) until the training is complete. Method 200 can optionally include the step of feeding asset condition 39, asset dependencies 73, asset vulnerabilities 75, and asset behaviors to analytical tools 77 to create the modified asset conditions.

In an alternate embodiment, an alternate method for aggregating and displaying asset information to create a common operating picture 32 that can be utilized to simulate an event 23 to train personnel and develop and test policies and procedures can include, but is not limited to, the steps of (a) preparing base canvas 27A from imagery 27 and data 29A associated with region 19 of interest associated with event 23, (b) identifying assets 53 required to respond to event 23, (c) identifying asset data 15 related to assets 53; (d) supplementing asset data by conducting automated queries against data feeds 13, (e) receiving location information 43 for assets 53, and (f) correlating and geospatially aligning data layers 31 and data from data feeds 13 with base canvas 27A according to location information 43. The alternate method can also include the steps of (g) providing correlated/aligned data 16, data layers 31, and base canvas 27A to the user, and (h) aggregating correlated/aligned data 16 into region display 34 including base canvas 27A, data layers 31, data from data feeds 13, and graphical representations 33 associated with selected assets 54 from assets 53. The alternate method can still further include the steps of (i) querying selected assets 54 to retrieve supplemented asset data associated with selected assets 54, (j) identifying, from supplemented asset data, asset dependencies 73, asset vulnerabilities 75, and asset behaviors of selected assets 54, and (k) creating common operating picture 32 based on base canvas 27A, data layers 31, data from data feeds 13, asset dependencies 73, asset vulnerabilities 75, and asset behaviors.

The alternate method can optionally include the steps of (l) identifying the region 19 of interest and event 23, (m) receiving and processing imagery 27 associated with region 19, (n) grouping assets 53 according to asset type 37A, (o) displaying each of asset type 37A as one data layer 31, (p) configuring location information 43 of one or more of graphical representations 33 so that location information 43 appears to be located on data layer 31, (q) displaying region display 34, (r) enabling manipulation of region display 34 in order to view selected areas within region display 34, (s) displaying selected assets 54 associated with graphical representations 33 in the selected areas, (t) aggregating and displaying asset data 15 from selected assets 54, and (u) creating common operating picture 32 based on steps (1) - (t).

Figure 11:
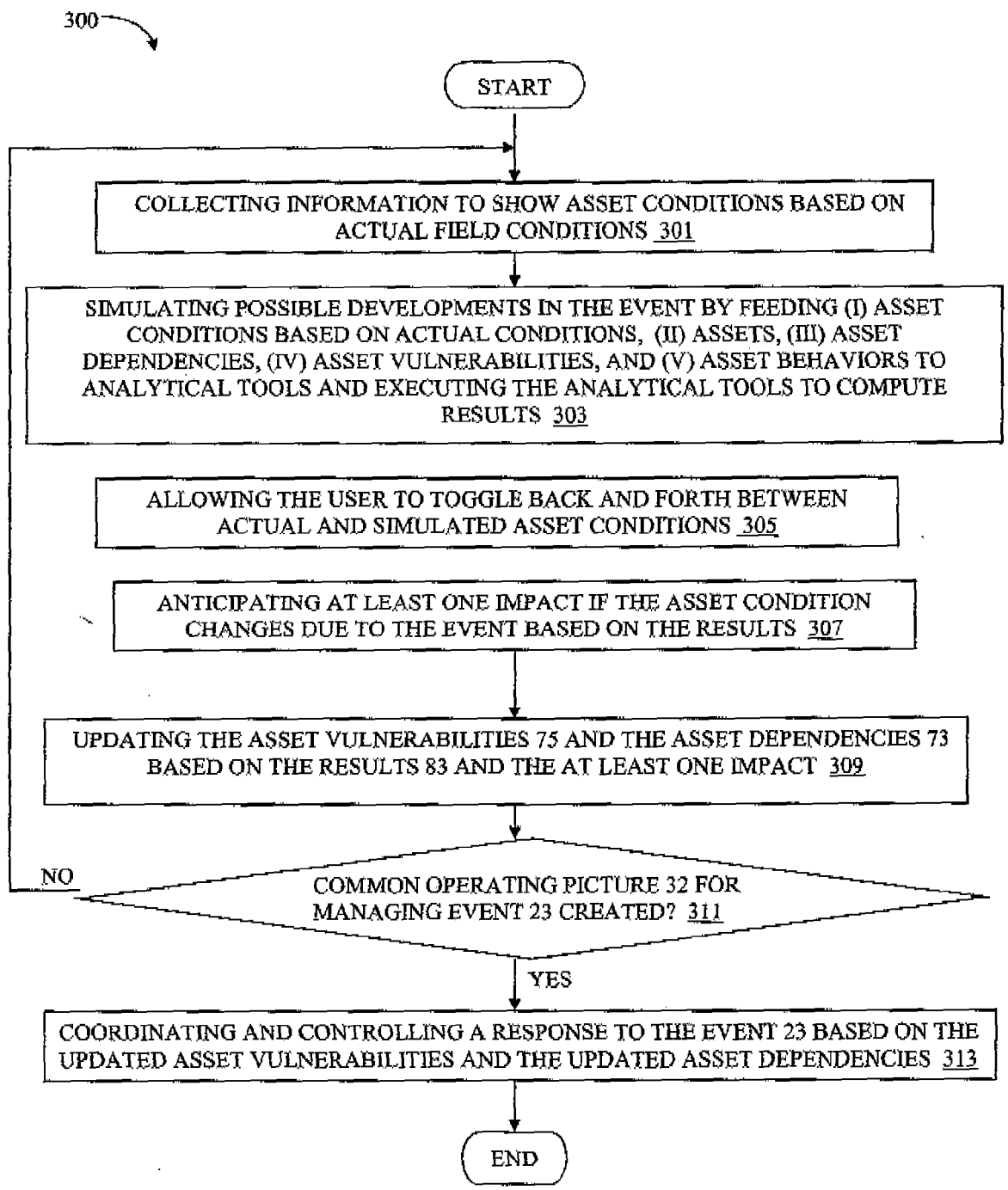
FIG. 11 is a flowchart of the use of the system of the present teachings for management of an actual event.

Referring now primarily to FIG. 11, method 300 for aggregating and displaying asset information to create common operating picture 32 for coordinating and controlling a response to an event 23 can include, but is not limited to including the steps of (a) collecting 301 information to show asset conditions 39 based on actual field conditions (b) simulating 303 possible developments in event 23 by feeding (ii) asset conditions 39 based on the actual field conditions, (ii) assets 53, (iii) asset dependencies 73, (iv) asset vulnerabilities 75, and (v) asset behaviors to analytical tools 77 and executing analytical tools 77 to compute results 83, (c) allowing 305 the user to toggle back and forth between actual and simulated asset conditions 39, (d) anticipating 307 at least one impact if asset condition 39 changes due to event 23 based on results 83, (e) updating 309 asset vulnerabilities 75 and asset dependencies 73 based on results 83 and the at least one impact, (f) repeating 311 steps (a) through (e) to create common operating picture 32 for managing event 23, and (g) coordinating and controlling 313 a response to event 23 based on the updated asset vulnerabilities and the updated asset dependencies. The step of coordinating and controlling 313 can include the step of deploying and tracking assets 53 based on location information 43 received from location receiver 92 and the response to event 23.

Method 300 can optionally include the steps of identifying region 19 impacted by event 23, displaying region display 34 and asset data 15 including assets 53, assent dependencies 73, and asset vulnerabilities 75, updating asset data 15 to form updated assets 55, and storing updated assets 55 on computer-readable medium 26. Method 300 can also optionally include as the steps of determining, for region 19, imagery 27 and other data 29A, for example, three-dimensional data, for base canvas 27A upon which selected data layers can be overlaid, acquiring imagery 27 and other data 29A to make base canvas 27A geospatially accurate, selecting assets 53 required to respond to event 23, identifying selected assets 54 equipped with global positioning system (GPS) transponders, for each of the selected GPS enabled assets, identifying location receiver 92 that can provide location information 43, and associating each of the selected GPS enabled assets with geospatial information based on location information 43. Method 300 can also optionally include the steps of grouping assets 53 into asset types 37A, associating graphical representation 33 with each asset type 37A. locating graphical representations 33 of the selected GPS enabled assets on base canvas 27A according to the geospatial information, identifying sources of data 29A for each of the selected GPS enabled assets, adding data geospatial information to the data 29A, associating the data 29A with graphical representation 33 according to the data geospatial information and the geospatial information, enabling manipulation of base canvas 27A, and enabling selective display of data layers 31 and assets 53. Method 300 can further optionally include the steps of enabling querying of asset 53 to display the data 29A, aggregating and displaying the data 29A associated with asset 53, updating the data 29A and the geospatial information in real time, resolving conflicts between data layers 31 using automated methods, identifying external data feeds and associating the external data feeds with assets 53, linking external analysis applications to assets 53, identifying asset dependencies 73, asset vulnerabilities 75, and asset behaviors, creating dependency information from asset dependencies 73, storing the dependency information on computer-readable medium 26, and implementing analysis tools 77 associated with data layers 31.

Referring primarily to FIGS. 7, 8, 9A-9B, 10A-10B, and 11, methods 200, 250, and 300 and systems 100 and 150 can be used operationally to prepare for an unexpected event by facilitating the steps of (a) identifying the geographic region of interest, (b) determining what kind of imagery 27 and data 29A would best serve as a base canvas 27A upon which selected data layers 31 can be overlaid (for example, two dimensional low resolution graphics, three dimensional high resolution graphics, maps, charts, etc.), (c) acquiring imagery 27 and data 29A to prepare a geospatially accurate base canvas 27, (d) identifying assets 53 required to accomplish the mission (for example, office buildings, fire stations, and railroads), (e) for each asset type 37A required, identifying location receiver 92 that can provide live information (for example, cameras and GPS locators), (f) creating data layer 31 for each asset type 37A with assets 53 identified by graphical representations 33, the locations of which align correctly with base canvas 27A, and (g) identifying sources of data 29A for each asset 53. The asset data 15 might already exist in geospatial format; for example, there may be a data base with the location of fire stations, and another with emergency equipment that may correspond to the same physical building, or in multiple conventional data bases, for example, building square footage may be contained in municipality tax records. Further steps facilitated by system 100 can include (h) in the case of non-geospatially oriented data, adding geospatial information to the data 29A so it can be referenced by clicking graphical representation 33 in data layer 31, (i) providing the capability to select base canvas 27A and manipulate it, for example, zooming in and out, and rotating) using intuitive hand gestures, (j) displaying multiple data sources in a common environment by allowing the selection of which assets 53 and data layers 31 are displayed, (k) allowing users to query an asset 53 by selecting it and summoning data from displayed and selected but not displayed data layers 31, and external data sources, and (l) aggregating and displaying data 29A concerning asset 53 such as, for example, asset data 15 and asset information 49 from displayed and selected data layers 31. The system can mark and/or highlight assets 53 that have changed according to the date of change and/or asset condition 39 that changed. Still further steps facilitated by system 100 can include (m) conducting an internet search to ascertain if more current asset data 15 is available, (n) using fuzzy logic to resolve conflicts between data layers 31, for example, inconsistent phone numbers, (o) identifying external data feeds providing additional information that is useful in performing analyses such as, for example, weather and traffic conditions, (p) adding external data feeds to a list of data layers 31 accessible to the user, (q) identifying analytical tools 77 that are useful in performing analyses, for example, plume dispersal models and blast damage models, (r) linking external analysis applications so that required inputs are supplied from AIMS 45 and results are fed back to AIMS 45, (s) identifying asset dependencies 73 and asset vulnerabilities 75 for example, services required for operation such as electricity and water, and conditions that prevent operation such as, for example, a flood above eight inches or wind speed greater than fifty mph, (t) recording model-specific dependency/vulnerability data and storing dependency information for future use, and (u) implementing analysis tools 77 as data layers 31 that utilize and interact with AIMS 45, for example, creating interdependency models and performing simulations.

Referring primarily to FIGS. 9A-9B, 10A-10B and 11, methods 250 (FIGS. 9A-9B), 200 (FIGS. 10A-10B), and 300 (FIG. 11) of the present embodiment can be, in whole or in part, implemented electronically.

The system and method of these teachings are, in one embodiment, implemented using a computer or network of computers and computer readable code, embodied in a computer usable medium, that uses relevant information obtaining one or more database and relevant geospatial information (location information, effectively longitude and latitude), description of the assets and the asset dependencies, for an event-driven simulation of the behavior of the critical infrastructure and key resources. Although these teachings are not limited to the exemplary embodiment, in one exemplary embodiment the system and methods are implemented using the Touch Assisted Command and Control System (TACCS™) which is disclosed in U.S. Pat. Application 12/208,738, which is incorporated by reference herein in its entirety and for all purposes.

Herein, various functions, functionalities or operations may be described as being performed by or caused by software program code to simplify description or to provide an example. However, those skilled in the art will recognize what is meant by such expressions is that the functions result from execution of the program code instructions by a computing device as described above, e.g., including a processor, such as a microprocessor, microcontroller, logic circuit or the like.

Control and data information can be electronically executed and stored on computer-readable medium. Common forms of computer-readable (also referred to as computer usable) media can include, but are not limited to including, for example, a floppy disk, a flexible disk, a hard disk, magnetic tape, or any other magnetic medium, a CDROM or any other optical medium, punched cards, paper tape, or any other physical or paper medium, a RAM, a PROM, and EPROM, a FLASH-EPROM, or any other memory chip or cartridge, or any other non-transitory medium from which a computer can read. As stated in the USPTO 2005 Interim Guidelines for Examination of Patent Applications for Patent Subject Matter Eligibility, 1300 Off. Gaz. Pat. Office 142 (Nov. 22, 2005), on the other hand, from a technological standpoint, a signal encoded with functional descriptive material is similar to a computer-readable memory encoded with functional descriptive material, in that they both create a functional interrelationship with a computer. In other words, a computer is able to execute the encoded functions, regardless of whether the format is a disk or a signal.

At least some aspects of the disclosed subject matter can be embodied, at least in part, utilizing programmed software code/instructions. That is, the functions, functionalities and/or operations techniques may be carried out in a computing device or other data processing system in response to its processor, such as a microprocessor, executing sequences of instructions contained in a memory, such as ROM, volatile RAM, non-volatile memory, cache or a remote storage device. In general, the routines executed to implement the embodiments of the disclosed subject matter may be implemented as part of an operating system or a specific application, component, program, object, module or sequence of instructions usually referred to as "computer programs," or "software." The computer programs typically comprise instructions stored at various times in various tangible memory and storage devices in a computing device, such as in cache memory, main memory, internal or external disk drives, and other remote storage devices, such as a disc farm, and when read and executed by a processor(s) in the computing device, cause the computing device to perform a method(s), e.g., process and operation steps to execute an element(s) as part of some aspect(s) of the method(s) of the disclosed subject matter.

A tangible machine readable medium (also referred to as non-transitory) can be used to store software and data that, when executed by a computing device, causes the computing device to perform a method(s) as may be recited in one or more accompanying claims defining the disclosed subject matter. The tangible machine readable medium may include storage of the executable software program code/instructions and data in various tangible locations, including for example ROM, volatile RAM, non-volatile memory and/or cache. Portions of this program software code/instructions and/or data may be stored in any one of these storage devices. Further, the program software code/instructions can be obtained from remote storage, including, e.g., through centralized servers or peer to peer networks and the like. Different portions of the software program code/instructions and data can be obtained at different times and in different communication sessions or in a same communication session.

The software program code/instructions and data can be obtained in their entirety prior to the execution of a respective software application by the computing device. Alternatively, portions of the software program code/instructions and data can be obtained dynamically, e.g., just in time, when needed for execution. Alternatively, some combination of these ways of obtaining the software program code/instructions and data may occur, e.g., for different applications, components, programs, objects, modules, routines or other sequences of instructions or organization of sequences of instructions, by way of example. Thus, it is not required that the data and instructions be on a single machine readable medium in entirety at any particular instance of time.

In general, a tangible machine readable medium includes any tangible mechanism that provides (i.e., stores) information in a form accessible by a machine (i.e., a computing device, which may be included, e.g., in a communication device, a network device, a personal digital assistant, a mobile communication device, whether or not able to download and run applications from the communication network, such as the Internet, e.g., an I-phone, Blackberry, Droid or the like, a manufacturing tool, or any other device including a computing device, comprising one or more data processors, etc.

Although these teachings have been described with respect to various embodiments, it should be realized these teachings are also capable of a wide variety of further and other embodiments within the spirit and scope of the appended claims.

What is claimed is:

1. A computer-implemented method for identifying and executing actions that will mitigate, with respect to one or more critical infrastructure or key resources, at least one of the projected effects thereon of at least one predetermined environmental condition associated with a disruptive event, the method comprising:

performing an event driven simulation of effect of the disruptive event by:

(a) determining location information associated with the disruptive event;

(b) creating a base canvas using the location information, wherein the base canvas includes imagery and at least one data layer;

(c) identifying assets associated with the location information, each of the assets being characterized by asset vulnerabilities, asset dependencies, asset behavior, asset type, and asset condition; the assets comprising infrastructure components and storage locations for other resources; wherein said asset vulnerabilities, said asset dependencies, and said asset behavior are used in determining how the at least one of projected effects would be reduced by mitigation activities and time and resources estimated to be required to perform said mitigation activities; wherein the assets are associated with the at least one data layer;

(d) selecting assets associated with the disruptive event;

(e) updating asset conditions for the selected assets based on the asset dependencies, the asset vulnerabilities, and the asset behaviors;

(f) determining changes in the updated asset conditions of the selected assets as a result of the disruptive event, at an instance in event evolution, based upon the location information, the updated asset conditions, the asset dependencies, the asset vulnerabilities, and the asset behaviors;

(g) updating, the updated asset conditions based on the asset vulnerabilities, the asset dependencies, the asset behaviors, the at least one data layer, and results of step (f);

(h) sending the results of steps (f) and (g) to a user; and (i) evolving the disruptive event to a next predetermined instance, and repeating steps (f) - (h) until the disruptive event has concluded;

determining, from performing the event driven simulation, the at least one projected effect of the at least one predetermined environmental condition on one or more critical infrastructure or key resources subjected to said at least one predetermined environmental condition and on other critical infrastructure and key resources dependent on said one or more critical infrastructure or key resources, each of the one or more critical infrastructure and key resources being subject to rules that prescribe the at least one projected effect of the at least one predetermined environmental condition on such critical infrastructure or key resource;

obtaining, from performing the event driven simulation, at least one activity that could be undertaken to mitigate the at least one projected effect of the at least one predetermined environmental condition on at least one of said one or more critical infrastructure and key resources, and extent of time and resources-required to perform the at least one activity;

identifying, from performing the event driven simulation, first Mitigation Assets that should be repositioned from locations at risk on account of the at least one projected effect of said at least one predetermined environmental condition, and emergency equipment and second Mitigation Assets that should be deployed to enable the mitigation activities to be undertaken following occurrence of the disruptive event causing said at least one predetermined environmental condition;

preparing, storing, and managing, from performing the event driven simulation, a combination of Mitigation Assets and other resources required to perform one or more of said mitigation activities in place to protect affected critical infrastructure and key resources against at least one effect of the at least one predetermined environmental condition;

determining, from performing the event driven simulation, based on selection of predetermined potentially affected critical infrastructure and key resources that would be the subject of said mitigation activities, and predetermined resources to be repositioned, and based upon prioritization of said mitigation activities and repositioning that might be undertaken and location and number of the Mitigation Assets and other resources available, a schedule for accomplishing all of the mitigation activities and repositioning;

determining, based on the schedule, if all of the mitigation activities can be completed in a predetermined time;

selecting, when all of the mitigation activities cannot be completed in the predetermined time, a different combination of potentially affected critical infrastructure and key resources, other resources that are to be repositioned, and the location and number of the Mitigation Assets and other resources available;

determining, from performing the event driven simulation, if the schedule for accomplishing all of the mitigation activities can be completed in the predetermined time;

adopting a resulting sequence of the mitigation activities as a baseline schedule to mitigate the at least one effect of the at least one predetermined environmental condition associated with the disruptive event;

sequentially dispatching Mitigation Assets to perform the mitigation activities as specified in the baseline schedule;

tracking, from performing the event driven simulation and using a predetermined schedule, dispatch, arrival on site, completion, and subsequent dispatch or return to a staging area for the Mitigation Assets assigned to each mitigation activity;

periodically comparing actual progress of the mitigation activities to the baseline schedule; and determining, based on performing the event driven simulation, projected progress toward accomplishing the mitigation activities; and, when there is an inability of available Mitigation Assets to accomplish planned mitigation activities on or before dates by which such planned mitigation activities are to be accomplished in accordance with the baseline schedule;

determining at least one of possible alternative mitigation activities or changes to the number or type of the mitigation activities to be undertaken in order to enable the mitigation activities to be accomplished within a baseline completion date.

2. The computer implemented method of claim 1 further comprising:

modifying deployment information for the Mitigation Assets; and obtaining new resulting schedules.

3. The computer implemented method of claim 2 wherein modifying the deployment information for Mitigation Assets previously determined to be available includes making available Mitigation Assets under the control of third parties and not previously included in the deployment information.

4. The computer implemented method of claim 1 wherein the number of critical infrastructure and key resources and the other critical infrastructure and key resources are identified without using critical decision points (CDPs), CDPs being identified as moments where a decision has greater potential to affect an outcome.

5. The computer implemented method of claim 1 wherein determining the at least one effect of the at least one predetermined environmental condition comprises:

creating a network for each of the one or more critical infrastructure and key resources, wherein each of the one or more critical infrastructure and key resources is connected to other of the one or more critical infrastructure and key resources upon which its continued operation depends;

integrating, after the networks are created, networks of dependencies and interdependencies across the number of critical infrastructure and key resources; and imposing the at least one predetermined environmental condition over a geographic area containing at least one of the number of critical infrastructure and key resources.

6. The computer implemented method of claim 1 wherein the at least one predetermined environmental condition corresponds to an actual at least one predetermined environmental condition; and wherein planning and optimizing mitigation of the at least one effect of the at least one predetermined environmental condition that corresponds to the actual at least one predetermined environmental condition on one or more critical infrastructure or key resource corresponds to disaster planning.

7. The computer implemented method of claim 1 wherein an extent of effort required comprises at least one of quantity of equipment, materials, supplies and crew-hours for each necessary capability of work crew.

8. The computer implemented method of claim 1 wherein the affected critical infrastructure or key resources comprises at least one of supplies or equipment.

9. The computer implemented method of claim 8 wherein the one or more of the mitigation activities comprise relocating the affected critical infrastructure or key resources to a place where it would not be subject to being adversely affected by such condition or would better facilitate conduct of such mitigation activities.

10. The computer implemented method of claim 1 wherein the predetermined time is a time remaining before forecasted occurrence of the disruptive_event.

11. The computer implemented method of claim 1 wherein sequentially dispatching personnel is performed using a human dispatcher.

12. A system for identifying and executing activities that will mitigate at least one of the effects of at least one predetermined environmental condition caused by an anticipated natural or human-initiated disruptive event, the system comprising:

at least one processor; and at least one tangible computer usable medium having computer readable code embodied therein, the computer readable code, when executed in the at least one processor, causes the at least one processor to:

perform an event driven simulation of effect of the natural or human-initiated disruptive event by:

(a) determining location information associated with the natural or human-initiated disruptive event;

(b) creating a base canvas using the location information, wherein the base canvas includes imagery;

(c) identifying assets associated with the location information, each of the assets being characterized by asset vulnerabilities, asset dependencies, asset behavior, asset type, and asset condition; the assets comprising infrastructure components and storage locations for other resources; wherein said asset vulnerabilities, said asset dependencies, and said asset behavior are used in determining how the effect would be reduced by mitigation activities and time and resources estimated to be required to perform said mitigation activities; wherein the assets are associated with the at least one data layer;

(d) selecting assets associated with the natural or human-initiated disruptive event;

(e) updating the asset conditions for selected assets based on the asset dependencies, the asset vulnerabilities, and the asset behaviors;

(f) determining changes in the updated asset conditions of the selected assets as a result of the natural or human-initiated disruptive event at an instance in event evolution based upon the location information, the updated asset conditions, the asset dependencies, the asset vulnerabilities, and the asset behaviors;

(g) updating, the updated asset conditions based on the asset vulnerabilities, the asset dependencies, the asset behaviors, the at least one data layer, and results of step (f);

(h) sending the results of steps (f) and (g) to a user; and (i) evolving the natural or human-initiated disruptive event to a next predetermined instance, and repeating steps (f)-(h) until the natural or human-initiated disruptive event has concluded;

obtain, from performing the event driven simulation, at least one activity that could be undertaken to mitigate at least one projected effect of the at least one predetermined environmental condition on at least one of one or more critical infrastructure and key resources or on at least one of the other critical infrastructure and key resources dependent on said at least one or more critical infrastructure or key resources, and extent of and resources required to perform the at least one activity;

identify, from performing the event driven simulation, those resources that are not Mitigation Assets that should be repositioned from locations at risk on account of the at least one projected effect of said at least one predetermined environmental condition, and emergency equipment and Mitigation Assets and other resources that should be deployed from among all available Mitigation Assets and other resources to enable the mitigation activities to be undertaken following occurrence of the natural or human initiated disruptive event causing said at least one predetermined environmental condition;

prepare, store, and manage, from results of performing the event driven simulation, a combination of the Mitigation Assets and other resources required to perform one or more the mitigation activities in place to protect affected critical infrastructure and key resources against the at least one effect of the at least one predetermined environmental condition;

determine, from performing the event driven simulation, based on selection of predetermined potentially affected critical infrastructure and key resources that would be subject of the mitigation activities, and predetermined resources to be repositioned, and based upon prioritization of the mitigation activities and repositioning that might be undertaken and location and number of the Mitigation Assets and other resources available, a schedule for accomplishing all of the mitigation activities and repositioning;

determine, based on the schedule, if all of the mitigation activities can be completed in a predetermined time;

select, when all of the mitigation activities cannot be completed in the predetermined the time, a different combination of potentially affected critical infrastructure and key resources, other resources that are to be repositioned, and the location and number of the Mitigation Assets and other resources available;

determine, from performing the event driven simulation, if the schedule for accomplishing all of the mitigation activities can be completed in the predetermined time;

adopt a resulting sequence of mitigation activities as a baseline schedule to mitigate at least one effect of the at least one predetermined environmental condition associated with the natural or human-initiated disruptive event;

sequentially dispatch the Mitigation Assets to perform the mitigation activities as specified in the baseline schedule;

track, from performing the event driven simulation and using a predetermined schedule, the dispatch, arrival on site, completion, and subsequent dispatch or return to a staging area for the Mitigation Assets assigned to each mitigation activity;

periodically compare actual progress of the mitigation activities to the baseline schedule; and determine, based on the performing the event driven simulation, projected progress toward accomplishing the mitigation activities; and, when there is an inability of the available Mitigation Assets to accomplish planned mitigation activities on or before dates by which such planned mitigation activities are to be accomplished in accordance with the baseline schedule;

determining at least one of possible alternative mitigation activities or changes to the number or type of mitigation activities to be undertaken in order to enable the mitigation activities to be accomplished within a baseline completion date.

13. The system of claim 12 wherein deployment information for the Mitigation Assets previously determined to be available includes deployment of Mitigation Assets not previously included in said deployment information.

14. The system of claim 12 wherein the computer readable code, when executed in the at least one processor, causes the at least one processor to:
modify the deployment information for the Mitigation Assets; and
obtain new resulting schedules.

15. The system of claim 14 wherein modifying the deployment information for the Mitigation Assets previously determined to be available includes deployment of Mitigation Assets not previously included in said deployment information.

16. The system of claim 12 wherein, in determining the at least one effect of the at least one predetermined environmental condition, the computer readable code, when executed in the at least one processor, causes the at least one processor to:
create a network for each of the one or more critical infrastructure and key resources, wherein each of the one or more critical infrastructure and key resources is connected to other one of the one or more critical infrastructure or key resources upon which its continued operation depends;
integrate, after the networks are completed, networks of dependencies and interdependencies across number of critical infrastructure and key resources; and
impose the at least one predetermined environmental condition over a geographic area containing at least one of the one or more critical infrastructure and key resources.

17. The system of claim 12 wherein an extent of effort required comprises at least one of quantity of equipment, materials, supplies and crew-hours for each necessary capability of work crew.

18. The system of claim 12 wherein the affected critical infrastructure or key resource comprises at least one of supplies or equipment.

19. The system of claim 18 wherein the one or more mitigation activities comprise relocating the affected critical infrastructure or key resource to a place where it would not be subject to being adversely affected by such condition or would better facilitate conduct of such mitigation activities.

20. The system of claim 12 wherein the predetermined time is a time remaining before forecasted occurrence of the natural or human-initiated event.

21. The system of claim 12 wherein sequentially dispatching personnel is performed using a human dispatcher.

\* \* \* \* \*